(12) United States Patent
Johnson

(10) Patent No.: US 10,137,863 B2
(45) Date of Patent: Nov. 27, 2018

(54) DETECTING FALSE POSITIONING SIGNALS BASED ON SURVEILLANCE SIGNALS

(71) Applicant: Honeywell International Inc., Morris Plains, NJ (US)

(72) Inventor: Daniel P. Johnson, Fridley, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/467,604

(22) Filed: Mar. 23, 2017

(65) Prior Publication Data

US 2018/0272993 A1 Sep. 27, 2018

(51) Int. Cl.
*B60R 25/10* (2013.01)
*B60R 25/33* (2013.01)

(52) U.S. Cl.
CPC ............. *B60R 25/33* (2013.01); *B60R 25/10* (2013.01)

(58) Field of Classification Search
None
See application file for complete search history.

(56) References Cited

U.S. PATENT DOCUMENTS

| 7,450,060 | B2 * | 11/2008 | Strachan | G01S 19/215 342/357.29 |
| 7,880,667 | B2 | 2/2011 | Lanzkron | |
| 9,052,375 | B2 | 6/2015 | Sampigethaya | |
| 9,116,240 | B2 | 8/2015 | Hall | |
| 9,140,561 | B2 * | 9/2015 | Bagnall | G01S 19/20 |
| 9,218,741 | B2 | 12/2015 | Wu et al. | |
| 9,465,104 | B2 | 10/2016 | Margolin | |
| 9,476,962 | B2 * | 10/2016 | Murphy | G01S 3/043 |
| 9,544,047 | B2 | 1/2017 | Sampigethaya | |
| 9,635,557 | B2 * | 4/2017 | Grobman | H04W 12/12 |
| 9,759,816 | B2 * | 9/2017 | Achanta | G01S 19/215 |

(Continued)

OTHER PUBLICATIONS

Costin et al., "Ghost in the Air (Traffic): On insecurity of ADS-B protocol and practical attacks on ADS-B devices," Eurecom, Jul. 2012, 9 pp.

(Continued)

*Primary Examiner* — Adolf Dsouza
(74) *Attorney, Agent, or Firm* — Shumaker & Sieffert, P.A.

(57) ABSTRACT

A system, configured to mount on an ownship vehicle, includes a transceiver configured to receive positioning signals and receive surveillance signals including surveillance data from a second vehicle and processing circuitry configured to determine a location of the ownship vehicle based on the positioning signals received by the transceiver and determine expected characteristics of the surveillance signals based on the surveillance data. The processing circuitry is further configured to compare the expected characteristics and actual characteristics of the surveillance signals received from the second vehicle and determine that the surveillance signals include a discrepancy indicative of false positioning signals in response to comparing the expected characteristics and the actual characteristics. The processing circuitry is configured to output an alert signal indicating the false positioning signals in response to determining that the surveillance signals include a discrepancy.

20 Claims, 13 Drawing Sheets

(56) References Cited

U.S. PATENT DOCUMENTS

| | | | |
|---|---|---|---|
| 2007/0194984 A1* | 8/2007 | Waid | G01S 19/215 |
| | | | 342/357.59 |
| 2010/0149019 A1 | 6/2010 | Smith et al. | |
| 2011/0057830 A1 | 3/2011 | Sampigethaya et al. | |
| 2011/0227787 A1* | 9/2011 | Gum | G01S 5/0215 |
| | | | 342/357.28 |
| 2012/0041620 A1 | 2/2012 | Stayton et al. | |
| 2016/0155342 A1* | 6/2016 | Gibson | G01S 5/0054 |
| | | | 701/409 |
| 2016/0309291 A1 | 10/2016 | Rodriguez Montejano et al. | |
| 2017/0280402 A1* | 9/2017 | Ruland | H04L 63/1475 |

OTHER PUBLICATIONS

Haomiao et al., "EBAA: An efficient broadcast authentication scheme for ADS-B communication based on IBS-MR," Chinese Journal of Aeronautics, vol. 27, No. 3, Jun. 2014, pp. 688-696.

McEntee et al., "Unmanned Aircraft Research in Support of NextGen Trajectory Based Operations," 27th Digital Avionics Systems Conference, Oct. 26-30, 2008, 10 pp.

Moser et al., "Investigation of Multi-device Location Spoofing Attacks on Air Traffic Control and Possible Countermeasures," MOBICOM conference 2016, Oct. 2016, 13 pp.

Thurber, "ADS-B is Insecure and Easily Spoofed, Say Hackers," http://www.ainonline.com/aviationnews/aviationinternationalnews/20120903/adsbinsecureandeasilyspoofedsayhackers, Sep. 3, 2012, 3 pp.

Extended Search Report from counterpart European Application No. 18162432.1, dated Aug. 20, 2018, 8 pp.

* cited by examiner

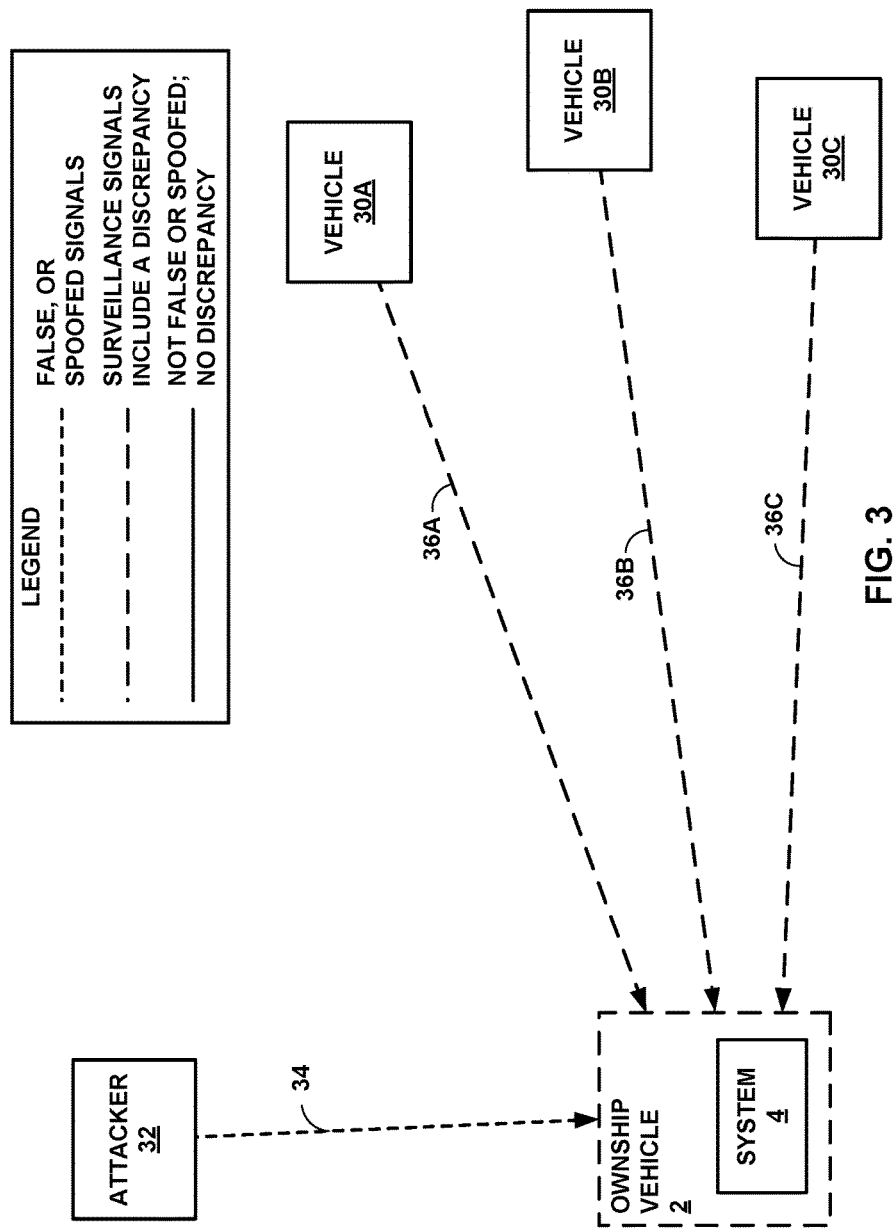

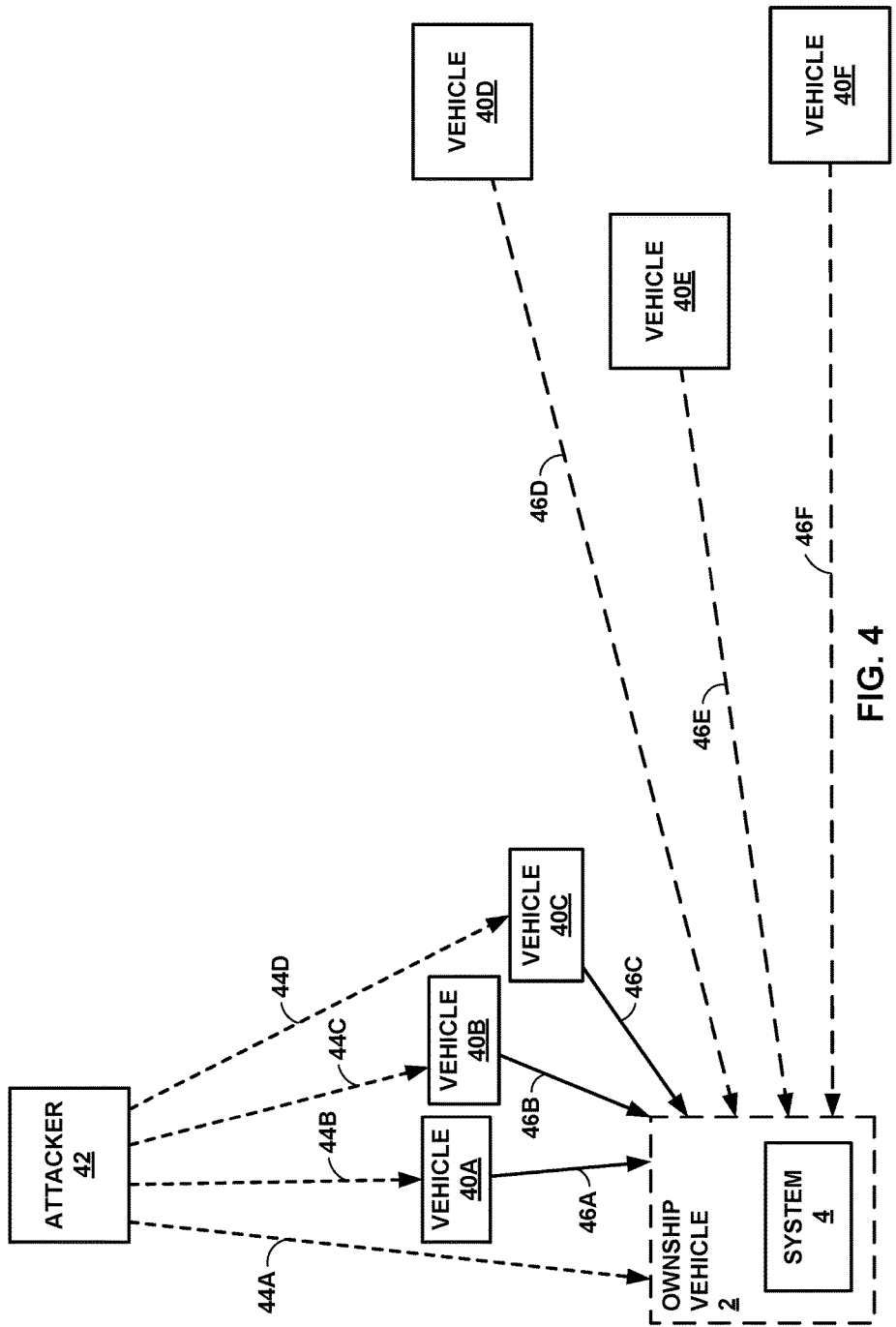

DETECTING FALSE POSITIONING SIGNALS BASED ON SURVEILLANCE SIGNALS

TECHNICAL FIELD

This disclosure relates to collision prevention for vehicles.

BACKGROUND

Vehicle traffic control systems, such as air traffic control systems, track positions and velocities of vehicles and help manage the trajectories of the vehicles. Vehicle traffic control may be based on radar surveillance, supplemented more recently with cooperative radio surveillance techniques, such as automatic dependent surveillance-broadcast (ADS-B). A vehicle may determine its own position, using, for example, a Global Navigation Satellite System (GNSS) configured to transmit positioning signals from multiple satellites to a receiver on the vehicle. The vehicle may periodically broadcast its position via surveillance signals at a radio frequency. Other vehicles and base stations may receive and read the surveillance signals to determine a location for the vehicle. Vehicle position data may be provided to a variety of other applications that serve functions such as traffic situational awareness, traffic alert, and collision avoidance, for example.

SUMMARY

This disclosure is directed to systems, devices, and methods for determining that a vehicle is receiving false positioning signals from an attacker. A vehicle that receives false positioning signals may inaccurately determine its location based on the false positioning signals. An ownship vehicle may include a system that is configured to determine that surveillance signals from a second vehicle include a discrepancy indicative of false positioning signals received by either the ownship vehicle or the second vehicle. The discrepancy may indicate that the ownship vehicle has incorrectly determined its location and/or that the second vehicle has incorrectly determined its location. Based on determining that the surveillance signals include the discrepancy, the system is configured to output an alert signal.

In one example, a system, configured to mount on an ownship vehicle, includes a transceiver configured to receive positioning signals and receive surveillance signals including surveillance data from a second vehicle. The system also includes processing circuitry configured to determine a location of the ownship vehicle based on the positioning signals received by the transceiver and determine expected characteristics of the surveillance signals based on the surveillance data. The processing circuitry is further configured to compare the expected characteristics and actual characteristics of the surveillance signals received from the second vehicle. The processing circuitry is also configured to determine that the surveillance signals include a discrepancy indicative of false positioning signals in response to comparing the expected characteristics and the actual characteristics. The processing circuitry is configured to output an alert signal indicating the false positioning signals in response to determining that the surveillance signals include a discrepancy.

In another example, a method including receiving positioning signals, receiving surveillance signals including surveillance data from a second vehicle, and determining a location of an ownship vehicle based on the positioning signals. The method further includes determining expected characteristics of the surveillance signals based on the surveillance data and comparing the expected characteristics and actual characteristics of the surveillance signals received from the second vehicle. The method also includes determining that the surveillance signals include a discrepancy indicative of false positioning signals in response to comparing the expected characteristics and the actual characteristics and outputting an alert signal indicating the false positioning signals in response to determining that the surveillance signals include a discrepancy.

Another example is directed to a device including a computer-readable medium having executable instructions stored thereon, configured to be executable by one or more processors for causing the one or more processors to determine a location of an ownship vehicle based on positioning signals received by a transceiver mounted on the ownship vehicle, and determine expected characteristics of surveillance signals received by the transceiver from a second vehicle based on surveillance data of the surveillance signals. The instructions are further executable for causing the one or more processors to compare the expected characteristics and actual characteristics of the surveillance signals received from the second vehicle, determine that the surveillance signals include a discrepancy indicative of false positioning signals in response to comparing the expected characteristics and the actual characteristics. The instructions are executable for causing the one or more processors to output an alert signal indicating the false positioning signals from an attacker in response to determining that the surveillance signals include a discrepancy.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a conceptual block diagram of the system of FIG. 1 receiving false positioning signals from an attacker and surveillance signals from other vehicles, in accordance with some examples of this disclosure.

FIG. 4 is a conceptual block diagram of the system of FIG. 1 and other vehicles receiving false positioning signals from an attacker, in accordance with some examples of this disclosure.

DETAILED DESCRIPTION

Figure 1:
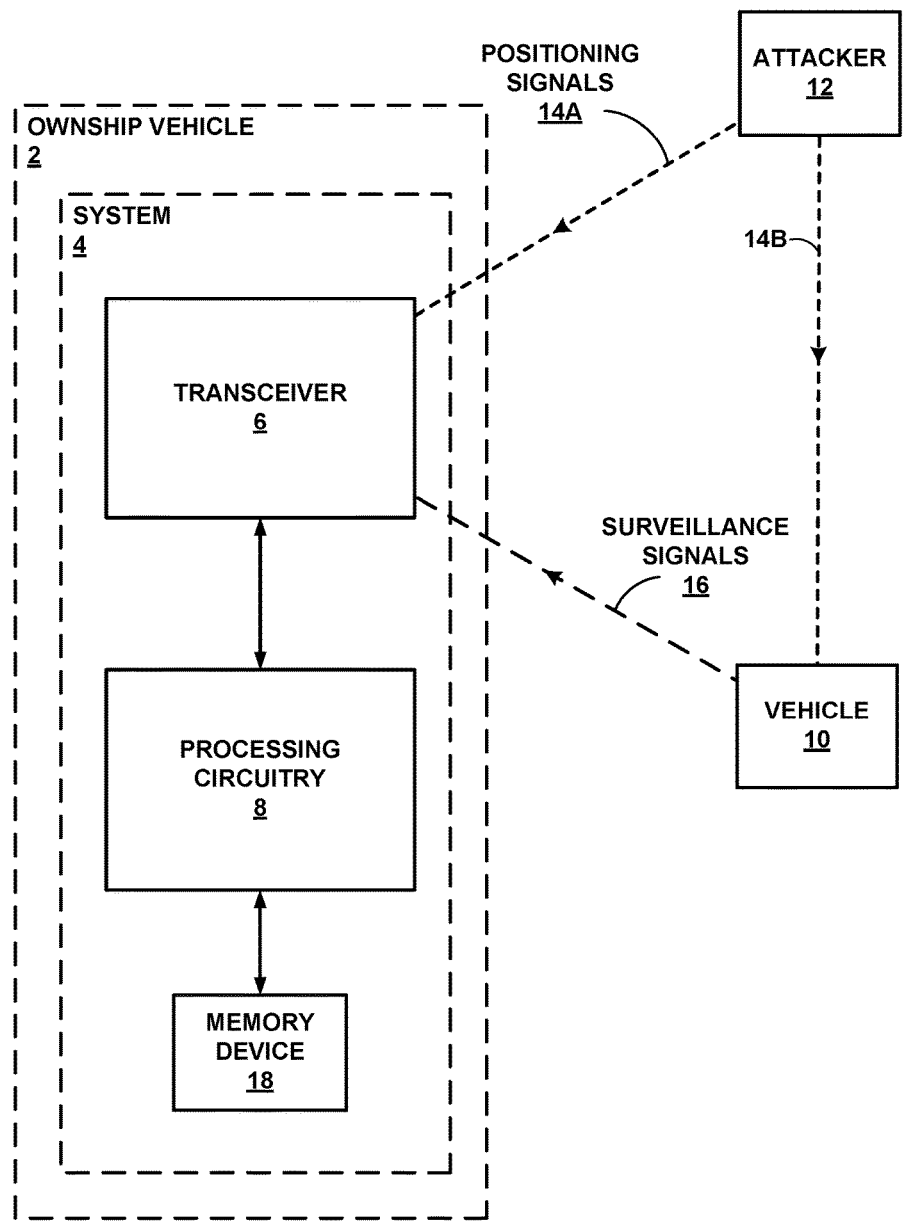
FIG. 1 is a conceptual block diagram of a system configured to determine that surveillance signals include a discrepancy indicative of false positioning signals, in accordance with some examples of this disclosure.

Various examples are described below generally directed to devices, systems, and methods for determining that surveillance signals received from another vehicle include a discrepancy indicative of false positioning signals. The false positioning signals may be received by a transceiver mounted onboard an ownship vehicle that is receiving the surveillance signals and/or by the other vehicle that is transmitting the surveillance signals. The false positioning signals may cause a receiving vehicle to incorrectly determine its location. In some examples, attackers can use pseudolites (i.e., transmitters) to spoof positioning signals, such as Global Navigation Satellite System (GNSS) signals and Global Positioning Signals (GPS), or use software-defined radio to spoof surveillance signals, such as automatic dependent surveillance-broadcast (ADS-B) out signals, to conduct attacks on vehicles. Use of existing surveillance signals to detect such spoofing may aid the security and safety of vehicle travel.

Pseudolites that can generate false positioning signals are commercially available and developable by non-industry individuals. Studies have shown that it is feasible to use a pseudolite to divert a yacht from its course by false positioning signals. The Iranian government may have brought down a U.S. government drone in 2011 using false positioning signals.

Surveillance signals that are unencrypted digital signals may also be susceptible to attackers. Surveillance signals may include a relative weak radio signal that can be overridden by a malicious source. Although researchers have exposed theoretical vulnerabilities and possible attacks, a debate continues because many experts do not view the possible attacks as practical.

Various systems exist to prevent several types of threats to vehicles. For example, ADS-B/Mode-S validation in a traffic collision avoidance system (TCAS) may be used to prevent collisions between moving vehicles and disruption by attackers, including decoy swarms that could be unleashed to overwhelm a detection system. As another example, an Inertial navigation system (INS)/positioning signal validation system may be used to prevent an attacker form diverting a vehicle into severe weather, a body of water, or into terrain. Ground systems and/or base stations may be used to prevent an attacker from creating a loss of service during a critical operation, such as landing, takeoff, and ground proximity operations. An attacker could simultaneously attack individual vehicles with both false surveillance signals and false positioning signals customized for each vehicle for the majority of traffic in proximity to an airport. Such an attack could lead to midair encounters in which pilots would have to manually evade other vehicle(s). A system of this disclosure may detect false positioning signals and/or false surveillance signals by analyzing the characteristics of surveillance signals.

A system of this disclosure may include a transceiver configured to receive positioning signals and surveillance signals. The system may include processing circuitry configured to determine the location of the ownship vehicle and the locations of other vehicles. A surveillance signal received by the transceiver on the ownship vehicle may include surveillance data relating to the location of the other vehicle. Processing circuitry of this disclosure may combine the position information with the GPS location of the ownship vehicle to determine expected characteristics of the surveillance signals, such as range and direction. The transceiver and/or processing circuitry may detect and date, clock, or time range and direction of the surveillance signals (i.e., actual characteristics). The transceiver may be a Mode-S transponder and may be configured to detect the actual characteristics of the surveillance signals. By comparing the two characteristics (i.e., the expected characteristics and the actual characteristics), the processing circuitry may determine that the surveillance signals include discrepancies.

Processing circuitry of this disclosure may detect spoofed positioning signals (i.e., false positioning signals) and spoofed ADS-B signal by comparing the expected characteristics and the actual characteristics. The processing circuitry may detect spoofed or false signals by comparison of the results among two or more vehicles in the vicinity, where the results may provide enough information to determine who is being spoofed and who is spoofing. Vehicles may communicate the determined locations of other vehicles in order to share information. A vehicle receiving this information may compare it against the receiving vehicle's determination of the locations of the other vehicles.

For example, if the ownship vehicle receives false positioning signals, the ownship vehicle may determine an incorrect location for the ownship vehicle. When the ownship vehicle receives accurate surveillance signals from another vehicle, the ownship vehicle may determine that the surveillance signals include a discrepancy based on comparing the expected characteristics and the actual characteristics of the surveillance signals. The expected characteristics of the surveillance signals may be incorrect based on the incorrectly determined location for the ownship vehicle.

If the other vehicle has received false positioning signals, the other vehicle may determine an incorrect location for the other vehicle. The other vehicle may transmit surveillance signals including incorrect surveillance data to the ownship vehicle. Based on the incorrect surveillance data received from the other vehicle, the ownship vehicle may determine incorrect expected characteristics. The ownship vehicle may then determine that the surveillance signals include a discrepancy based on comparing the incorrect expected characteristics and the actual characteristics of the surveillance signals.

A system of this disclosure may be implemented in an existing system by software modifications and/or upgrades. Other proposed systems may require additional hardware to detect false signals. Other proposed systems may also require GNSS transmitters and/or other vehicles to change their behavior or transmit different signals to verify the information in surveillance signals or positioning signals. A system of this disclosure may be implemented without any changes in the behavior of GNSS transmitters or other vehicles.

FIG. 1 is a conceptual block diagram of system 4 configured to determine that surveillance signals 16 include a discrepancy indicative of false positioning signals 14A or 14B, in accordance with some examples of this disclosure. System 4 may be mounted onboard ownship vehicle 2. System 4 includes transceiver 6, processing circuitry 8, and optional memory device 18. Transceiver 6 is configured to receive positioning signals, such as false positioning signals 14A from attacker 12, and surveillance signals such as surveillance signals 16 from vehicle 10.

Ownship vehicle 2 and/or vehicle 10 may be any mobile object or remote object including system 4 configured to determine a position for ownship vehicle 2 and vehicle 10. In some examples, ownship vehicle 2 and/or vehicle 10 may be an aircraft such as a helicopter or a weather balloon, or ownship vehicle 2 and/or vehicle 10 may be a space vehicle such as a satellite or spaceship. In yet other examples, ownship vehicle 2 and/or vehicle 10 may include a land vehicle such as an automobile or a water vehicle such as a ship or a submarine. Ownship vehicle 2 and/or vehicle 10 may be a manned vehicle or an unmanned vehicle, such as a drone, a remote-control vehicle, or any suitable vehicle without any pilot or crew on board.

Ownship vehicle 2 and vehicle 10 may include equipment for determining the information included in the surveillance data. For example, ownship vehicle 2 and vehicle 10 may include satellite navigation equipment such as a Global Positioning System (GPS) or any other suitable means for determining the location of ownship vehicle 2 and/or vehicle 10. System 4 may include processing circuitry 8 configured to determine the speed, velocity, bearing, and course of ownship vehicle 2 using, for example, satellite navigation, gyroscopic instruments, a compass, flight plan data, and/or any other suitable equipment. Processing circuitry 8 may be configured to determine the course of ownship vehicle 2 using the current trajectory of ownship vehicle 2 along with the flight plan and destination of ownship vehicle 2.

In some examples, system 4 may also include an inertial navigation system (INS) that may be multiply redundant and fail-op/fail-safe. The INS may determine a highly accurate turn rate, velocity, and acceleration for ownship vehicle 2. The position drifting error may be approximately one nautical mile per hour (1.852 kilometers per hour). The INS may be sufficient for stand-alone navigation of ownship vehicle 2 without determining the locations of other vehicles. If ownship vehicle 2 does not have INS (e.g., general aviation (GA), unmanned vehicles (UVs)), ownship vehicle 2 may include another source of redundant navigation information to avoid the threat of diversion. This other source may include distance to ground station, traffic within fourteen nautical miles (25.93 kilometers) with surveillance signals, and/or ground surveillance.

System 4 may include a GPS system configured to determine the absolute position of ownship vehicle 2. However, the GPS system may not be as accurate for landing, takeoff, turn rate, velocity, and acceleration, as compared to the INS. A GPS system may not include an integrity signal, and there may be degraded coverage issues, such that there are locations and times when the GPS system is inaccurate. For critical operations of ownship vehicle 2, ground station augmentation may be used for safe operation. The augmentation may include wide-area augmentation system (WAAS) for integrity and availability validation and differential GPS (DGPS) for error correction to improve accuracy.

In some examples, system 4 may include altitude and terrain maps for navigation purposes. The maps may include pressure altitude, navigation, and charts that provide a long-standing basis for avoiding terrain. The maps may include standard flight paths for avoiding ground proximity, except for airports. Enhanced ground proximity systems may include radar altimeters and electronic databases for navigation purposes.

In some examples, system 4 may include a traffic collision avoidance system (TCAS) for determining potential collision threats. TCAS II may be configured to maintain surveillance of all vehicle traffic within fourteen nautical miles (25.93 kilometers) of ownship vehicle 2 through a Mode-S transponder such as transceiver 6. TCAS II may include active tracking for close traffic and passive tracking for more distant traffic. Passive tracking may use a digital position message within surveillance signals 16 to estimate the track of vehicle 10. Active tracking may use a transponder signal (i.e., actual characteristics of surveillance signals 16) to estimate range and direction to estimate the track of vehicle 10. For active tracking, TCAS II may validate that the active data agrees with the passive data. In some examples, TCAS II may be limited to areas with sufficient traffic.

If vehicle 10 does not have TCAS II (e.g., GA, UVs), ownship vehicle 2 may include some other source of ADS-B/Mode-S validation (e.g. ground surveillance) to avoid the threat of collision. TCAS ADS-B/Mode-S validation may detect discrepancies aircraft-to-aircraft discrepancies transmitted by attacker 12 to cause a collision. However, a fleet-wide diversion may not be detectable by TCAS until an INS limit is reached. A collision may be possible by spoofing surveillance signals and positioning signals simultaneously, but the spoofing would have to be a fleet-wide spoof with separate GPS solutions for each vehicle. TCAS ADS-B/Mode-S validation may detect false transponders in this scenario.

Aircraft navigation (other than loss of service during critical operation) may not change because existing detection and annunciation of errors in positioning signals may be sufficient. For vehicle-to-vehicle communication, short-range ADS-B/Mode S validation may be modified in TCAS II to detect and annunciate systematic validation failure as possible failure of traffic avoidance system due to an airworthiness security event. An issue remains for GA and UVs, except when ground surveillance is available. Design and operation of the ground stations may address loss of service during critical operation.

Transceiver 6 may include equipment for receiving positioning signals 14A and surveillance signals 16. In some examples, positioning signals 14A may include GPS signals, and surveillance signals 16 may include ADS-B signals. In some examples, transceiver 6 may include ADS-B in and out capabilities. The Federal Aviation Administration (FAA) has mandated that aircraft operating in airspace that now requires a Mode-C transponder must be equipped with ADS-B out by Jan. 1, 2020.

Transceiver 6 may include a Mode-S transponder for receiving surveillance signals 16 and optionally transmitting surveillance signals. Transceiver 6 may transmit surveillance signals in digital format including the location of ownship vehicle 2. Transceiver 6 and/or processing circuitry 8 may detect the actual characteristics of surveillance signals 16, such as the direction from which surveillance signals 16 are received by transceiver 6. Transceiver 6 and/or processing circuitry 8 may be configured to detect direction based on the phase difference across an array of antenna elements in transceiver 6. The actual characteristics may also include the range of surveillance signals 16, which transceiver 6 and/or processing circuitry 8 may be configured to determine based on time of arrival and/or amplitude of surveillance signals 16. Transceiver 6 may also include a receiver configured to receive positioning signals 14A. In some examples, the receiver for positioning signals 14A may be combined or separate from the receiver for surveillance signals 16.

In some examples, the actual characteristics of surveillance signals 16 may differ (i.e., include a discrepancy) from the expected characteristics, which are based on the surveillance data in surveillance signals 16. The discrepancy in surveillance signals 16 may be the result of transceiver 6 receiving false positioning signals 14A, vehicle 10 receiving false positioning signals 14B, and/or vehicle 10 transmitting false surveillance signals 16.

Processing circuitry 8 is configured to determine a location of ownship vehicle 2 based on positioning signals 14A. In some examples, processing circuitry 8 may be configured to determine the location of ownship vehicle 2 based on positioning signals received from four or more sources through a triangulation process. Processing circuitry 8 may be configured to determine the location of vehicle 10 based on the surveillance data in surveillance signals 16. Processing circuitry 8 may also be configured to determine the expected characteristics of surveillance signals 16 based on the surveillance data. The surveillance data may indicate the location of vehicle 10, and processing circuitry 8 may be configured to determine a direction vector from transceiver 6 to vehicle 10. The direction vector may be the direction from which transceiver 6 could be expected to have received surveillance signals 16.

The expected characteristics of surveillance signals 16 may include a phase shift across antenna elements of transceiver 6 and/or the angle, amplitude, and/or time of arrival of surveillance signals 16. Processing circuitry 8 may be configured to determine the expected characteristics of surveillance signals 16 by at least determining an expected angle of arrival of surveillance signals 16 or an expected phase shift across antenna elements of transceiver 6 caused by receiving surveillance signals 16.

Processing circuitry 8 may be further configured to determine the actual characteristics of surveillance signals 16 based on data received from transceiver 6. Transceiver 6 may be configured to detect the direction from which transceiver 6 received surveillance signals 16. Processing circuitry 8 may be further configured to compare the expected characteristics and the actual characteristics of surveillance signals 16. Comparing the expected characteristics and the actual characteristics may be referred to as ADS-B/Mode-S validation or surveillance signal/Mode-S validation.

In accordance with the techniques of this disclosure, processing circuitry 8 is configured to determine that surveillance signals 16 include a discrepancy indicative of false positioning signals 14A or 14B in response to comparing the expected characteristics and the actual characteristics. Processing circuitry 8 may, for example, be configured to determine that a difference between the expected characteristics and the actual characteristics exceeds a threshold level. Processing circuitry 8 may be configured to determine that surveillance signals 16 from vehicle 10 include a discrepancy, in response to determining that the difference between the expected characteristics and the actual characteristics exceeds the threshold level. The threshold level may be an angle between the expected angle of receipt of surveillance signals 16 and actual angle of receipt.

Processing circuitry 8 is configured to output an alert signal indicating false positioning signals 14A or 14B in response to determining that surveillance signals 16 include a discrepancy. The alert signal may indicate that transceiver 6 received false positioning signals 14A or that vehicle 10 received false positioning signals 14B. Processing circuitry 8 may be configured to generate a warning based on the determining discrepancy and output the warning to a crewmember and/or a pilot of ownship vehicle 2. Processing circuitry 8 may be configured to output the warning to a ground crew member, a satellite, a traffic management system, and/or a base station. Processing circuitry 8 may be configured to transmit the alert signal to nearby vehicles, such as vehicle 10. In some examples, processing circuitry 8 may be configured to output the alert signal to a display device and/or an audio device to alert a crewmember of ownship vehicle 2.

Vehicle 10 may include a transceiver with capability to transmit surveillance signals 16 and receive positioning signals 14B. Vehicle 10 may include processing circuitry configured to determine the location of vehicle 10 based on positioning signals received from multiple transmitters. The processing circuitry of vehicle 10 may generate and transmit surveillance signals 16 based on the determined location for vehicle 10. In some examples, surveillance signals 16 may include a discrepancy if the processing circuitry of vehicle 10 determined an incorrect location for vehicle 10 based on, for example, false positioning signals 14B received from attacker 12. As a result, surveillance signals 16 may include surveillance data including the incorrect location for vehicle 10.

In some examples, vehicle 10 may be in communication with ownship vehicle 2 and other vehicles regarding the locations of vehicles. Vehicle 10 may be configured to communicate to other vehicles, including ownship vehicle 2, if vehicle 10 determines that a source is transmitting false positioning signals and/or false surveillance signals. Vehicle 10 may also be configured to receive alert signals from other vehicles, such as ownship vehicle 2, indicating that a source is transmitting false positioning signals and/or false surveillance signals. In some examples, the alert signals received from other vehicles may indicate that the other vehicles have received surveillance signals that did not include a discrepancy.

Attacker 12 may be configured to transmit false positioning signals 14A to ownship vehicle 2 and/or false positioning signals 14B to vehicle 10. Attacker 12 may transmit false positioning signals to all vehicles within the range or line of sight of attacker 12. In some examples, attacker 12 may also be configured to transmit false surveillance signals to ownship vehicle 2 and/or vehicle 10. Attacker 12 may be a vehicle, a ground object, an airborne object, a satellite, and/or any other transmitter of false positioning signals 14A and/or 14B. Attacker 12 may be a pseudolite that simulates GPS satellite signals. In some examples, attacker 12 may be configured to lead ownship vehicle 2 and/or vehicle 10 off course by transmitting false positioning signals 14A and/or 14B.

Attacker 12 may cause a gradual drift error in the course of ownship vehicle 2 by transmitting false positioning signals 14A. The gradual drift may be detectable by the INS drift resolution module, which may be called INS/GPS validation or INS/positioning signal validation. Significant error could also be detectable by WAIS and DGPS in the vicinity of an airport. False positioning signals 14A and/or false surveillance signals may cause degradation of navigation accuracy to a low multiple of basic INS error and/or denial of service during critical operation of ownship vehicle 2 at an airport (e.g. approach and landing, take-off, ground proximity).

Memory device 18 may be configured to store data relating to the location of ownship vehicle 2. Memory device 18 may also be configured to store expected characteristics of surveillance signals 16 based on the surveillance data in surveillance signals 16. In some examples, memory device 18 may be configured to store alert signals outputted by processing circuitry 8 and/or alert signals received from other vehicles.

Figure 2:
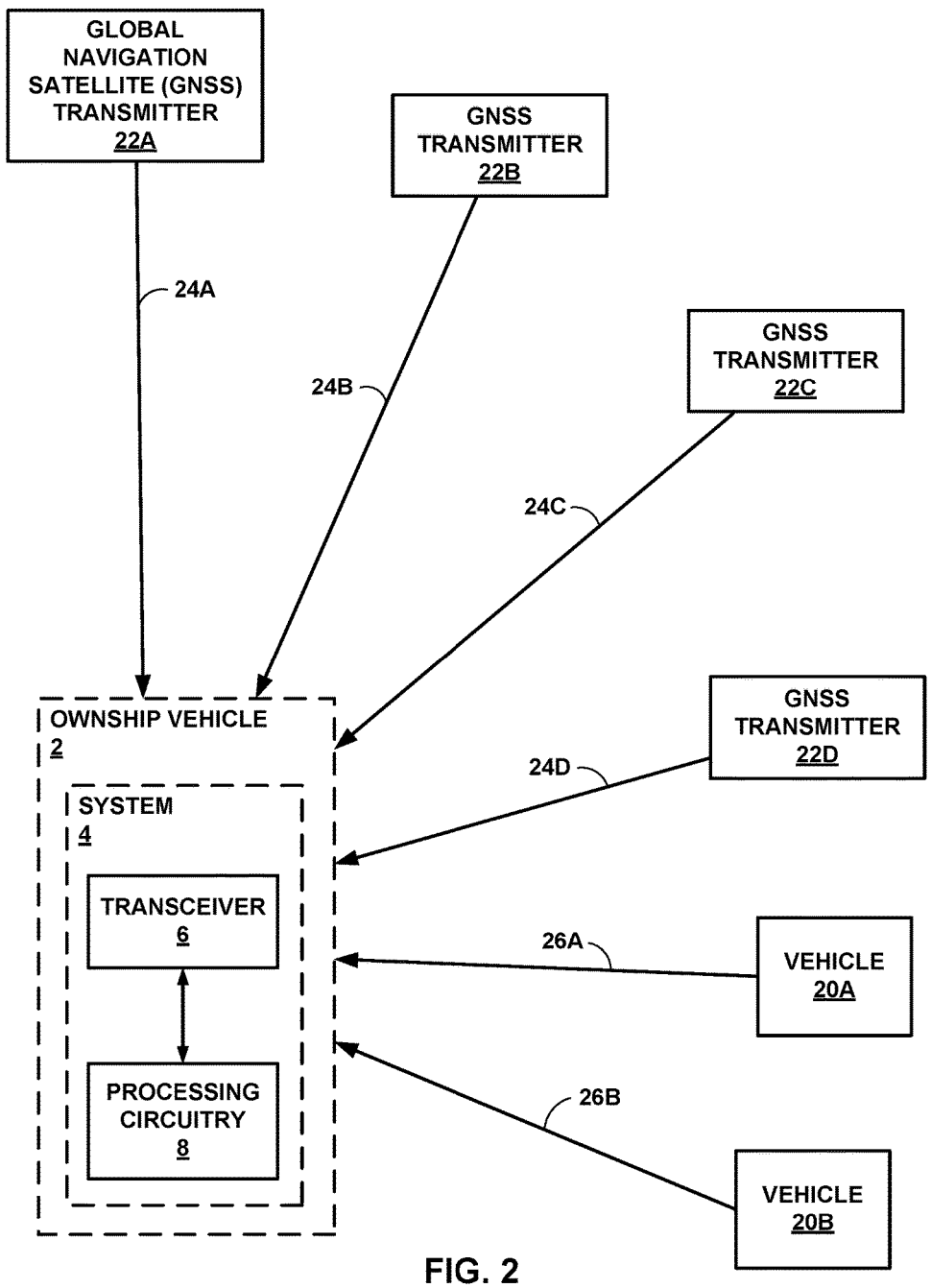
FIG. 2 is a conceptual block diagram of the system of FIG. 1 configured to receive positioning signals from Global Navigation Satellite System (GNSS) transmitters, in accordance with some examples of this disclosure.

FIG. 2 is a conceptual block diagram of system 4 configured to receive positioning signals 24A-24D from GNSS transmitters 22A-22D, in accordance with some examples of this disclosure. Processing circuitry 8 is configured to determine the location of ownship vehicle 2 based on positioning signals 24A-24D received by transceiver 6. Transceiver 6 is configured to receive surveillance signals 26A and 26B from vehicles 20A and 20B. Processing circuitry 8 may be configured to determine locations of vehicles 20A and 20B based on the surveillance data in surveillance signals 26A and 26B.

Positioning signals 24A-24D may include location data for GNSS transmitters 22A-22D and clock data for the time of transmission by GNSS transmitters 22A-22D. The location data for one of GNSS transmitters 22A-22D may include three coordinates for the respective one of GNSS transmitters 22A-22D. Processing circuitry 8 may be configured to determine the location of ownship vehicle 2 based on the location data and clock data in positioning signals 24A-24D.

System 4 may alert ownship vehicle 2 and/or vehicles 20A and 20B based on a comparison of the expected characteristics and the actual characteristics of surveillance signals 26A and 26B. As one example, system 4 may classify vehicle 20A as green if processing circuitry 8 determines that surveillance signals 26A received from vehicle 20A do not include a discrepancy and classify vehicle 20B as red if processing circuitry 8 determines that surveillance signals 26B received from vehicle 20B include a discrepancy. The potential for a separation violation may be highest when there are adjacent vehicles that are flagged as red. In some examples, a separation violation is defined as coming within one thousand feet vertically or one nautical mile (1.852 km) horizontally. In some examples, a low number of adjacent red vehicles may imply that the locations of the red vehicles are uncertain and may be in error or being spoofed. In some examples, a high number of adjacent red vehicles may imply the location of ownship vehicle 2 is uncertain and may be in error or being spoofed by one or more of GNSS transmitters 22A-22D.

In FIGS. 3-9, lines with arrows represent surveillance signals and positioning signals. Shorter-dashed lines may represent false, or spoofed, signals. Longer-dashed lines may represent surveillance signals that include a discrepancy, as determined by the received vehicle. Solid lines may represent signals that are not false or spoofed and do not include a discrepancy.

FIG. 3 is a conceptual block diagram of system 4 receiving false positioning signals 34 from attacker 32 and surveillance signals 36A-36C from vehicles 30A-30C, in accordance with some examples of this disclosure. Based on false positioning signals 34, processing circuitry 8 may determine an incorrect location for ownship vehicle 2. Based on the incorrect location and the surveillance data in each of surveillance signals 36A-36C, processing circuitry 8 may determine expected characteristics for each of surveillance signals 36A-36C. The expected characteristics for each of surveillance signals 36A-36C may be incorrect because of the incorrectly determined location of ownship vehicle 2.

Processing circuitry 8 may compare the incorrect expected characteristics and the actual characteristics of surveillance signals 36A-36C, where transceiver 6 may be configured to detect the actual characteristics of each of surveillance signals 36A-36C. Processing circuitry 8 may be configured to determine that each of surveillance signals 36A-36C include a discrepancy based on determining that the incorrect expected characteristics are different than the actual characteristics. In some examples, processing circuitry 8 may be configured to apply a filter or threshold to discard smaller differences between the expected characteristics and the actual characteristics.

Processing circuitry 8 may determine that each of vehicles 30A-30C are red, based on determining that each of surveillance signals 36A-36C include a discrepancy. The determination that vehicles 30A-30C are red may be incorrect due to the incorrect determined location of ownship vehicle 2 and the incorrect expected characteristics for each of surveillance signals 36A-36C. The incorrect determination that each of vehicles 30A-30C are red could result in a separation violation because ownship vehicle 2 may travel too close to one of vehicles 30A-30C.

In accordance with the techniques of this disclosure, processing circuitry 8 may be configured to determine that transceiver 6 received false positioning signals 34 from attacker 32 in response to determining that all of surveillance signals 36A-36C include a discrepancy. If all received surveillance signals include a discrepancy, ownship vehicle 2 may be receiving false positioning signals 34.

In addition, processing circuitry 8 may be configured to determine that transceiver 6 received false positioning signals 34 from attacker 32 in response to determining that surveillance signals from more than one vehicle include a discrepancy. The determination that transceiver 6 received false positioning signals 34 may also be in response to determining that vehicles 30A-30C are adjacent to each other and not to ownship vehicle 2. Vehicles 30A-30C are adjacent to each other and not to ownship vehicle 2 if vehicle 30A is closer than ownship vehicle 2 to vehicles 30B and 30C, if vehicle 30B is closer than ownship vehicle 2 to vehicles 30A and 30C, and vehicle 30C is closer than ownship vehicle 2 to vehicles 30A and 30B. If adjacent vehicles are transmitting incorrect surveillance signals, the adjacent vehicles may be within a line of sight of attacker 32, while ownship vehicle 2 may not be within the line of sight of attacker 32. Alternatively, if vehicles 30A-30C are spread out, the likelihood that each of vehicles 30A-30C received false positioning signals from the same attacker may be lower, such that processing circuitry 8 may be configured to determine that transceiver 6 received false positioning signals 34.

Ownship vehicle 2 may output an alert signal to the crewmembers of ownship vehicle 2 indicating that transceiver 6 received false positioning signals 34 and/or that the GNSS system of system 4 may have failed. Ownship vehicle 2 may also transmit an alert signal to vehicles 30A-30C indicating that each of surveillance signals 36A-36C include a discrepancy, that transceiver 6 received false positioning signals 34, and/or that the GNSS system of system 4 may have failed. Each of vehicles 30A-30C may have determined that ownship vehicle 2 is red based on surveillance signals transmitted by transceiver 6. One or more of vehicles 30A-30C may transmit an alert signal to ownship vehicle 2 indicating that the surveillance signals transmitted by transceiver 6 include a discrepancy. The determination that transceiver 6 received false positioning signals 34 may be further in response to receiving an alert signal from one of vehicles 30A-30C indicating that the surveillance signals transmitted by transceiver 6 included a discrepancy.

FIG. 4 is a conceptual block diagram of system 4 and other vehicles 40A-40C receiving false positioning signals 44A-44D from attacker 42, in accordance with some examples of this disclosure. Based on false positioning signals 44A, processing circuitry 8 may determine an incorrect location for ownship vehicle 2. The surveillance data of each of surveillance signals 46A-46C may include incorrectly determined locations for each of vehicles 40A-40C. The surveillance data of each of surveillance signals 46D-46F may include correctly determined locations for each of vehicles 40D-40F because vehicles 40D-40F may not have received false positioning signals from attacker 42.

Based on the incorrect location of ownship vehicle 2 and the surveillance data in each of surveillance signals 46A-46F, processing circuitry 8 may determine expected characteristics for each of surveillance signals 46A-46F. The expected characteristics for each of surveillance signals 46A-46C may be correct because each of vehicles 2 and 40A-40C may have determined its location with similar inaccuracies, such as a similar drift. The expected characteristics for each of surveillance signals 46D-46F may be incorrect because of the incorrectly determined location of ownship vehicle 2.

Processing circuitry 8 may compare the correct expected characteristics and the actual characteristics of surveillance signals 46A-46F. Processing circuitry 8 may be configured to determine that surveillance signals 46A-46C do not include a discrepancy based on determining that the expected characteristics are similar to the actual characteristics. Processing circuitry 8 may be configured to determine that each of surveillance signals 46D-46F includes a discrepancy based on determining that the incorrect expected characteristics are different than the actual characteristics.

Processing circuitry 8 may determine that each of vehicles 40A-40C are green, based on determining that surveillance signals 46A-46C do not include a discrepancy. Processing circuitry 8 may determine that each of vehicles 40D-40F are red, based on determining that each of surveillance signals 46D-46F include a discrepancy. Each of vehicles 40A-40C may also incorrectly determine that vehicles 2 and 40A-40C are green and vehicles 40D-40F are red. The incorrect determination that each of vehicles 40D-40F are red could result in a separation violation at the boundary between the first group of vehicles 2 and 40A-40C and the second group of vehicles 40D-40F.

In accordance with the techniques of this disclosure, processing circuitry 8 may be configured to determine that transceiver 6 received false positioning signals 44A and that vehicle 40A received false positioning signals 44B in response to determining that surveillance signals 46A include a discrepancy and that surveillance signals 46D do not include a discrepancy. In some examples, processing circuitry 8 may be configured to determine only that transceiver 6 received false positioning signals 44A or only that vehicle 40A received false positioning signals 44B in response to determining that surveillance signals 46A include a discrepancy and that surveillance signals 46D do not include a discrepancy. The determination that transceiver 6 and vehicle 40A received false positioning signals 44A and 44B may also be in response to determining that vehicle 40A is closer than vehicle 40D to ownship vehicle 2. If ownship vehicle 2 and an adjacent vehicle receive false positioning signals from the same attacker, processing circuitry 8 may not identify a discrepancy in the surveillance signals from the adjacent vehicle.

Ownship vehicle 2 may output an alert signal to the crewmembers of ownship vehicle 2 indicating that transceiver 6 and vehicles 40A-40C received false positioning signals 44A-44D and/or that the GNSS system of system 4 may have failed. Ownship vehicle 2 may also transmit an alert signal to vehicles 40A-40F indicating that vehicles 40A-40C received false positioning signals 44A-44D. Each of vehicles 40D-40F may have determined that ownship vehicle 2 is red based on surveillance signals transmitted by transceiver 6.

One or more of vehicles 40D-40F may transmit an alert signal to ownship vehicle 2 indicating that the surveillance signals transmitted by transceiver 6 include a discrepancy. The determination that transceiver 6 received false positioning signals 44A may be further in response to receiving an alert signal from one of vehicles 40D-40F indicating that the surveillance signals transmitted by transceiver 6 included a discrepancy. Transceiver 6 may transmit an alert signal indicating that vehicles 2 and 40A-40C received false positioning signals 44A-44D or that the GNSS systems of vehicles 2 and 40A-40C may have failed.

Figure 5A:
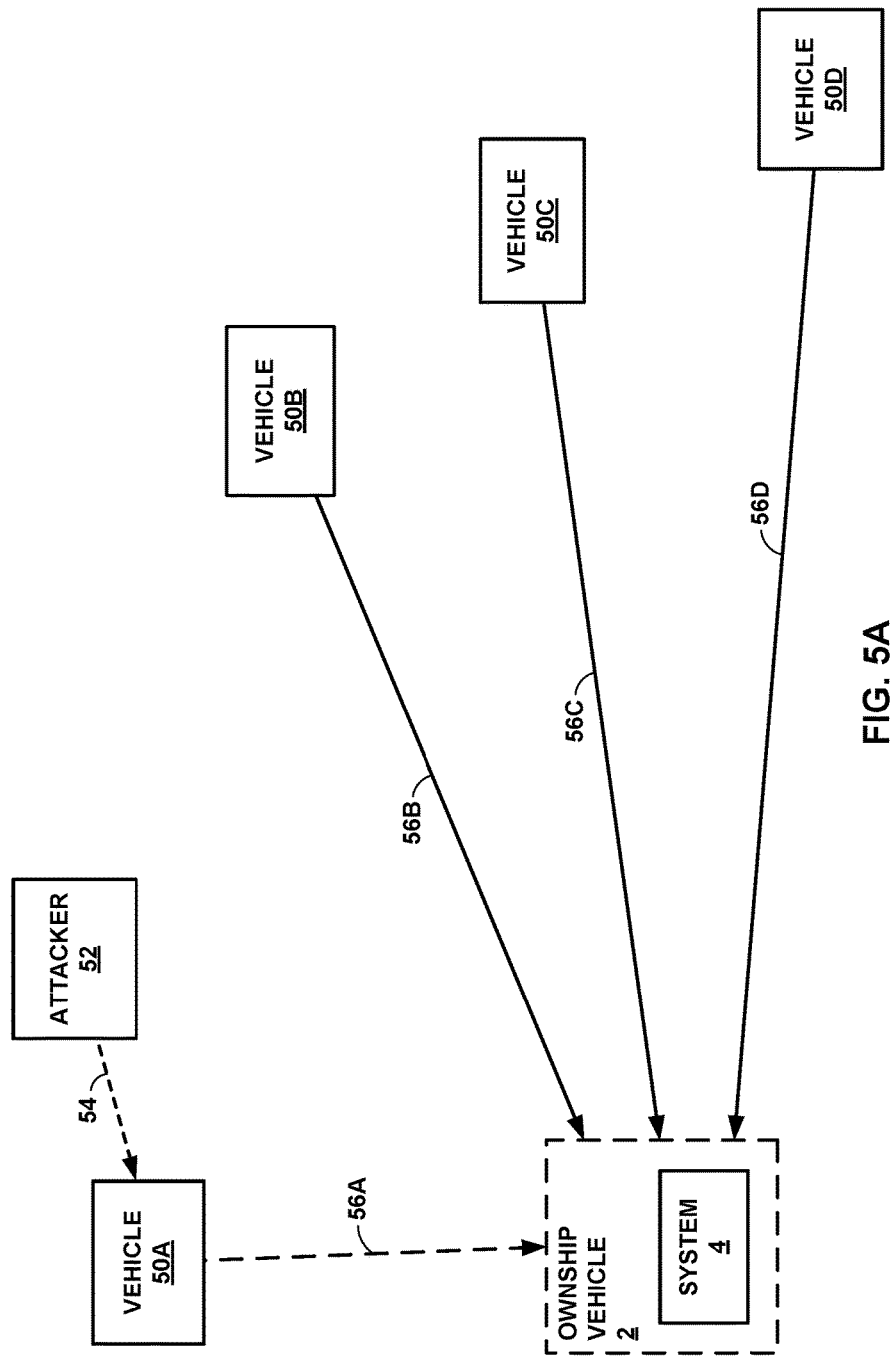
FIG. 5A is a conceptual block diagram of the system of FIG. 1 receiving surveillance signals including a discrepancy from another vehicle that is receiving false positioning signals, in accordance with some examples of this disclosure.

FIG. 5A is a conceptual block diagram of system 4 receiving surveillance signals 56A-56C including a discrepancy from vehicle 50A that is receiving false positioning signals 54, in accordance with some examples of this disclosure. Based on false positioning signals 54, vehicle 50A may determine an incorrect location for itself. The surveillance data of surveillance signals 56A may include the incorrectly determined location for vehicle 50A. The surveillance data of each of surveillance signals 56B-56D may include correctly determined locations for each of vehicles 50B-50D because vehicles 50B-50D may not have received false positioning signals from attacker 52. Processing circuitry 8 may also determine a correct location for ownship vehicle 2.

Based on the surveillance data in surveillance signals 56A, processing circuitry 8 may determine expected characteristics for surveillance signals 56A, where the expected characteristics are based on the incorrectly determined location of vehicle 50A. The expected characteristics for each of surveillance signals 46D-46F may be incorrect because of the incorrectly determined location of ownship vehicle 2.

Processing circuitry 8 may compare the incorrect expected characteristics and the actual characteristics of surveillance signals 56A and determine that surveillance signals 56A include a discrepancy. Processing circuitry 8 may be configured to determine that each of surveillance signals 56B-56D do not include a discrepancy. Processing circuitry 8 may determine that vehicle 50A is red, based on determining that surveillance signals 56A include a discrepancy. Processing circuitry 8 may determine that each of vehicles 50B-50D are green.

In accordance with the techniques of this disclosure, processing circuitry 8 may be configured to determine that vehicle 50A received false positioning signals 54 in response to determining that surveillance signals 56A include a discrepancy and that surveillance signals 56D do not include a discrepancy. The determination that vehicle 50A received false positioning signals 54 may also be in response to determining that ownship vehicle 2 is closer than vehicle 50A to vehicle 50D. In some examples, the determination that vehicle 50A received false positioning signals 54 may also be in response to determining that ownship vehicle 2 is closer than vehicle 50D to vehicle 50A. If ownship vehicle 2 is located between the red vehicle and the green vehicle, the red vehicle may be receiving false positioning signals. This determination may be more conclusive based on the number and spread of green vehicles, as well as any other red vehicles that are located adjacent to each other.

The determination that vehicle 50A received false positioning signals 54 may be further in response to receiving an alert signal from one of vehicles 50B-50D. The alert signal may indicate that surveillance signals transmitted by vehicle 50A to the respective one of vehicles 50B-50D included a discrepancy. Transceiver 6 may also be configured to transmit an alert signal to vehicles 50A-50D indicating that surveillance signals 56A included a discrepancy. The alert signal transmitted by transceiver 6 may also indicate that the vehicle 50A received false positioning signals 54 or that the GNSS system of vehicle 50A may have failed.

Figure 5B:
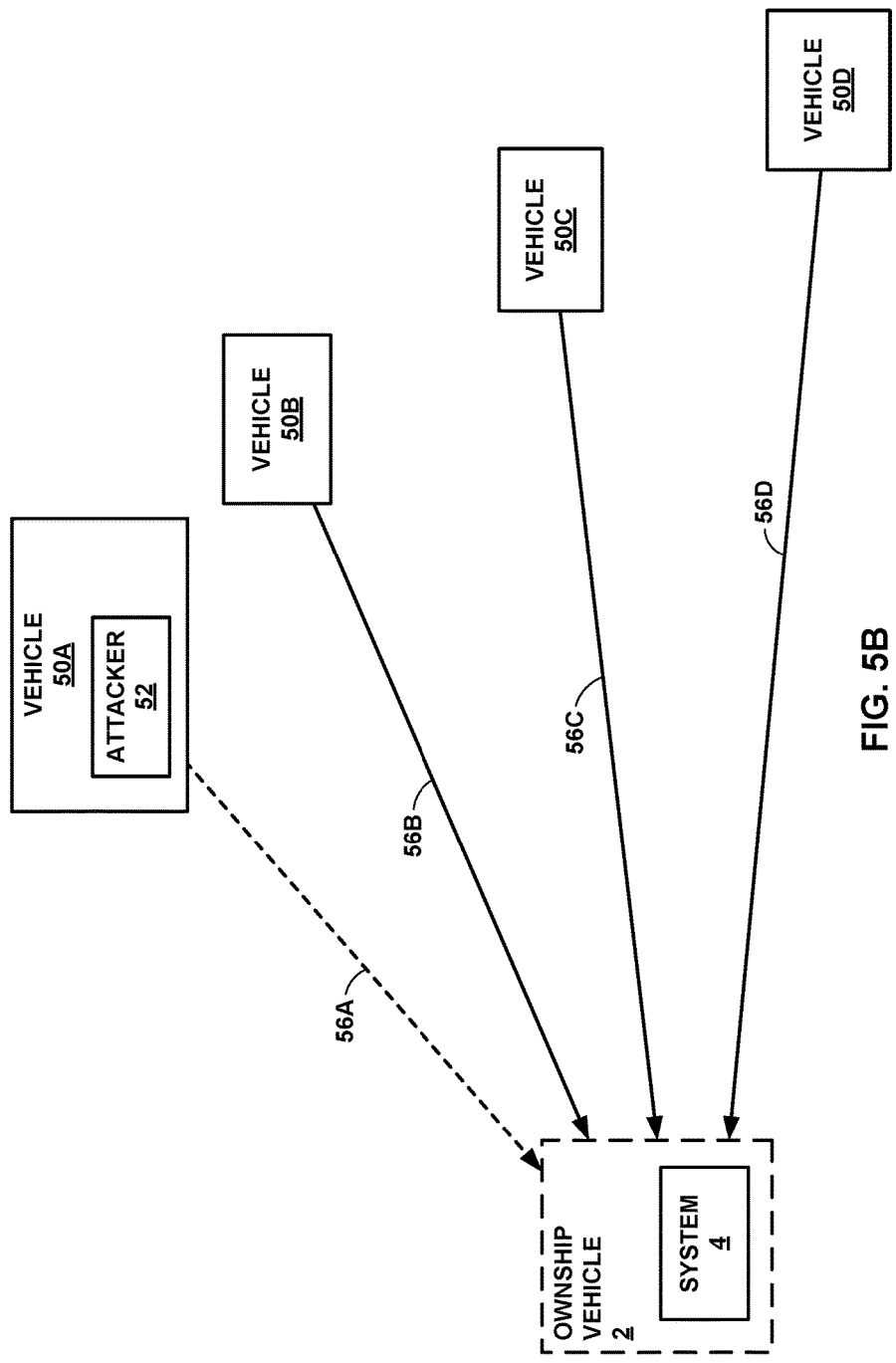
FIG. 5B is a conceptual block diagram of the system of FIG. 1 receiving false surveillance signals from another vehicle that includes the attacker, in accordance with some examples of this disclosure.

FIG. 5B is a conceptual block diagram of system 4 receiving false surveillance signals 56A from vehicle 50A that includes attacker 52, in accordance with some examples of this disclosure. From the point of view of ownship vehicle 2, the situations depicted in FIGS. 5A and 5B may appear the same because, in both situations, processing circuitry 8 may determine that surveillance signals 56A include a discrepancy based on comparing the expected characteristics and the actual characteristics of surveillance signals 56A. In FIG. 5B, surveillance signals 56A may be spoofed by attacker 52.

Depending on the locations of vehicles 50A-50D, processing circuitry 8 may determine that vehicle 50A is receiving false positioning signals or that vehicle 50A is transmitting false surveillance signals. Processing circuitry 8 may output an alert signal indicating that surveillance signals 56A include a discrepancy. Transceiver 6 may transmit the alert signal to one or more of vehicles 50A-50D indicating that surveillance signals 56A include a discrepancy.

Figure 6:
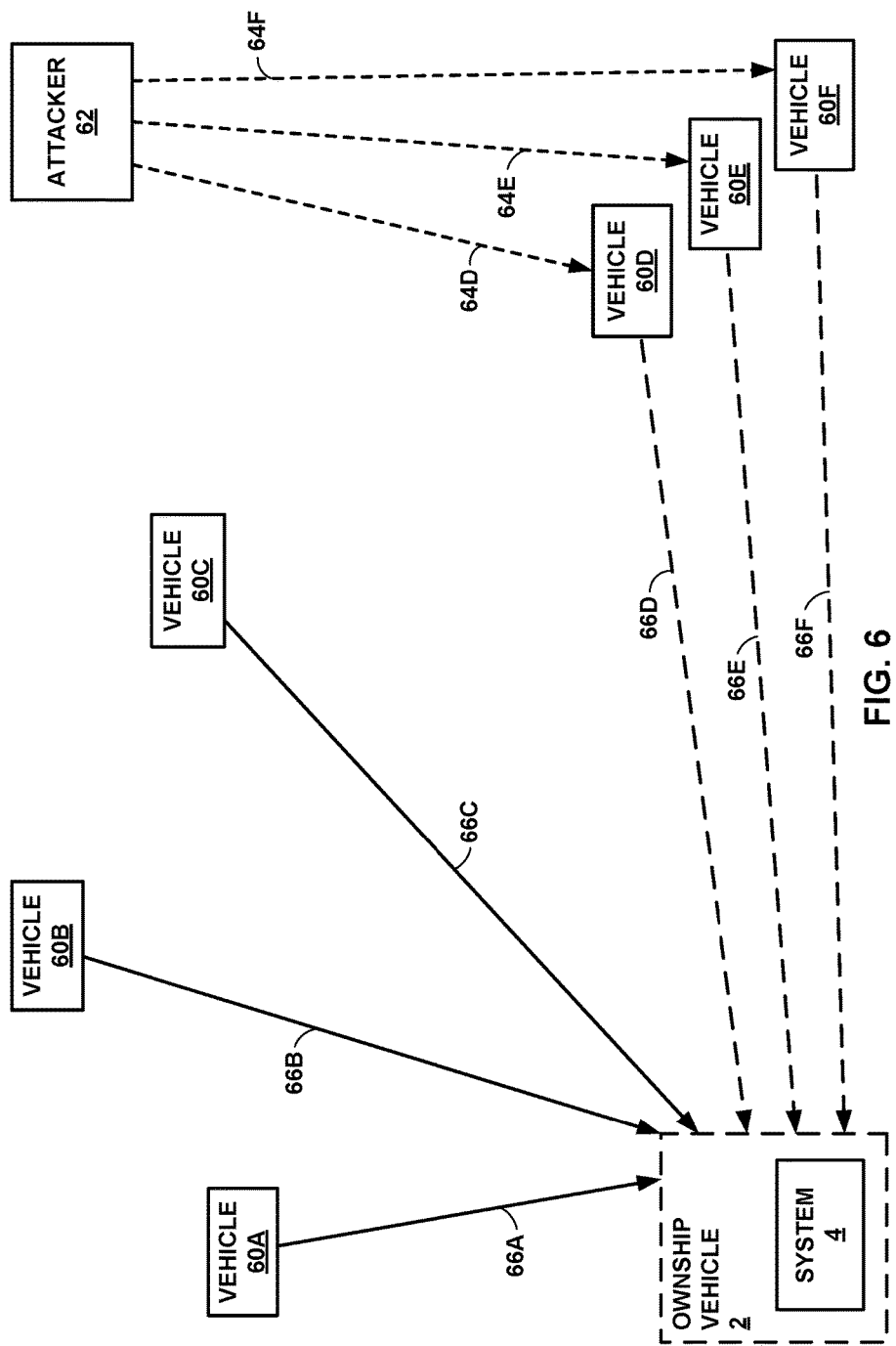
FIG. 6 is a conceptual block diagram of the system of FIG. 1 receiving surveillance signals including a discrepancy from remote vehicles that are receiving false positioning signals, in accordance with some examples of this disclosure.

FIG. 6 is a conceptual block diagram of system 4 receiving surveillance signals 66D-66F including a discrepancy from remote vehicles 60D-60F that are receiving false positioning signals 64D-64F, in accordance with some examples of this disclosure. Based on false positioning signals 64D-64F, vehicles 60D-60F may determine incorrect location for vehicles 60D-60F. The surveillance data of surveillance signals 66D-66F may include the incorrectly determined locations for vehicles 60D-60F. The surveillance data of each of surveillance signals 66A-66C may include correctly determined locations for each of vehicles 60A-60C because vehicles 60A-60C may not have received false positioning signals from attacker 62. Processing circuitry 8 may also determine a correct location for ownship vehicle 2.

Based on the surveillance data in surveillance signals 66D-64F, processing circuitry 8 may determine expected characteristics for surveillance signals 66D-66F, where the expected characteristics are based on the incorrectly determined locations of vehicles 60D-60F. Processing circuitry 8 may compare the incorrect expected characteristics and the actual characteristics of surveillance signals 66D-66F and determine that each of surveillance signals 66D-66F include a discrepancy. Processing circuitry 8 may be configured to determine that each of surveillance signals 66A-66C do not include a discrepancy. Processing circuitry 8 may determine that vehicles 60D-60F are red, based on determining that each of surveillance signals 66D-66F include a discrepancy. Processing circuitry 8 may determine that each of vehicles 60A-60C are green.

In accordance with the techniques of this disclosure, processing circuitry 8 may be configured to determine that vehicles 60D-60F received false positioning signals 64D-64F in response to determining that each of surveillance signals 66D-66F include a discrepancy and that surveillance signals 66A-66C do not include a discrepancy. The determination that vehicles 60D-60F received false positioning signals 64D-64F may be in response to determining that one or more of vehicles 60D-60F did not indicate any discrepancy in the surveillance signals received from one or more other vehicles of vehicles 60D-60F. The determination that vehicles 60D-60F received false positioning signals 64D-64F may also be in response to determining that each of vehicles 60D-60F are closer than ownship vehicle 2 to the others of vehicles 60D-60F. If ownship vehicle 2 detects that a group of adjacent, remote vehicles are red and all other vehicles are green, processing circuitry may be configured to determine that the adjacent, remote vehicles received false positioning signals. This determination may be strengthened by alert signals received from others of vehicles 60A-60C.

Transceiver 6 may be configured to transmit an alert signal to vehicles 60A-60F indicating that vehicles 60D-60F may have received false positioning signals 64D-64F or that the GNSS systems of vehicles 60D-60F may have failed. The alert signal may also indicate that the locations of vehicles 60D-60F are uncertain. One or more of vehicles 60A-60F may transmit signals indicating whether surveillance signals received from another vehicle include a discrepancy. Ownship vehicle 2 may receive a signal from one of vehicles 60D-60F indicating that the surveillance signals received from another one of vehicles 60D-60F included a discrepancy, which may support the determination that vehicles 60D-60F received false positioning signals 64D-64F from attacker 62.

Figure 7:
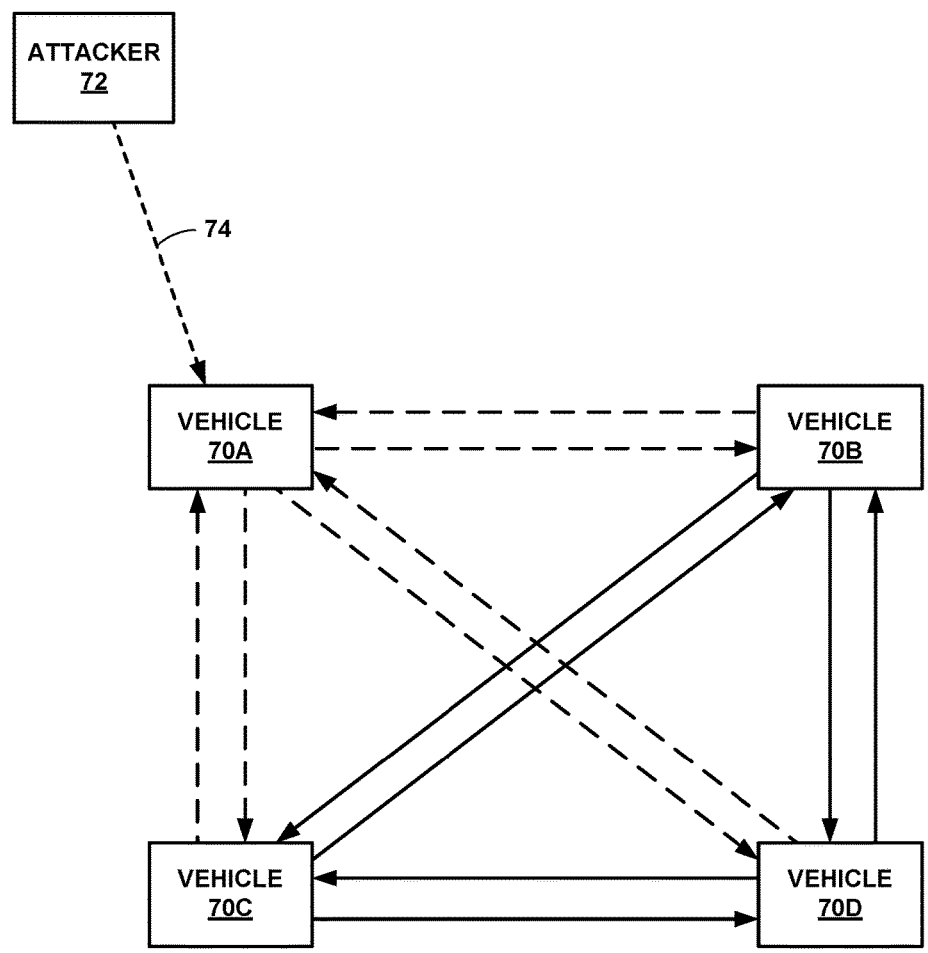
FIG. 7 is a conceptual block diagram of a group of vehicles including a vehicle that is receiving false positioning signals, in accordance with some examples of this disclosure.

FIG. 7 is a conceptual block diagram of a group of vehicles 70A-70D including vehicle 70A that is receiving false positioning signals 74, in accordance with some examples of this disclosure. Vehicle 70A may determine an incorrect location for itself and transmit surveillance signals to vehicles 70B-70D that include incorrect location data. Vehicle 70A may determine that each of the surveillance signals received from vehicles 70B-70D include a discrepancy because vehicle 70A has determined an incorrect location for itself.

Vehicle 70A may transmit alert signals to vehicles 70B-70D indicating that the surveillance signals received by vehicle 70A include a discrepancy. Vehicles 70B-70D may transmit alert signals to vehicles 70A-70D indicating that the surveillance signals transmitted by vehicle 70A include a discrepancy. Vehicle 70A may determine that attacker 72 is transmitting false positioning signals 74 based on the analysis of the surveillance signals and the alert signals received by vehicle 70A.

Figure 8:
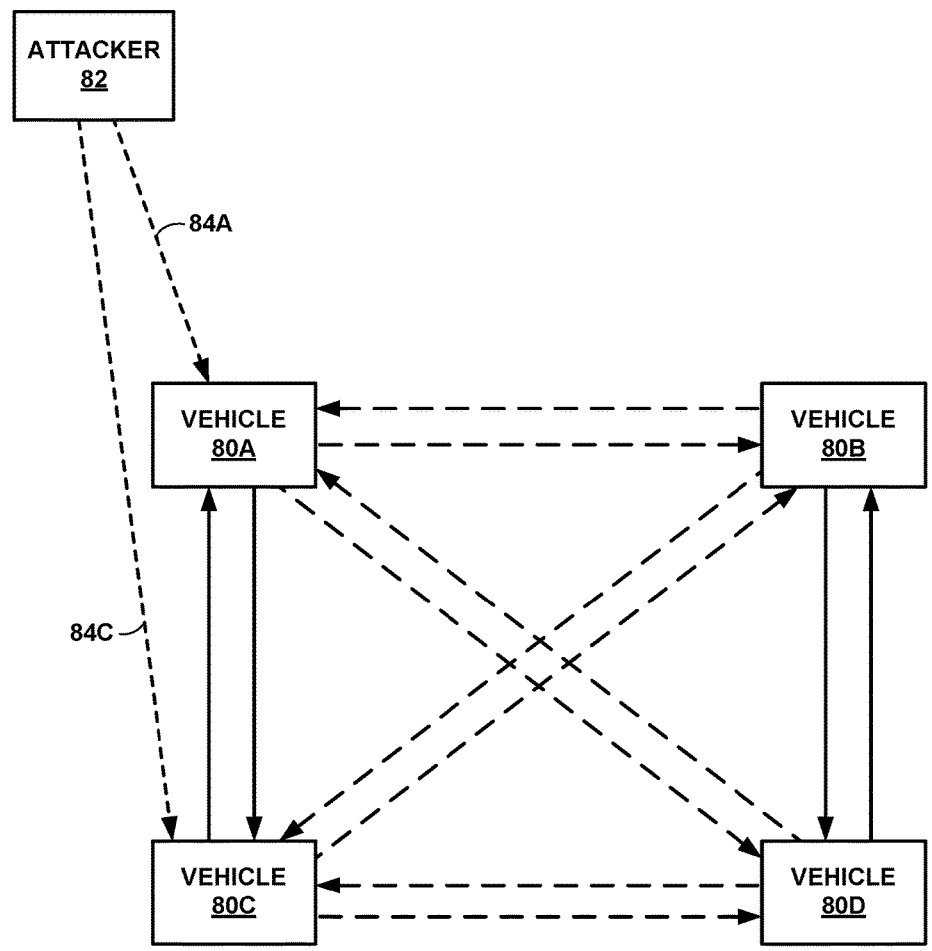
FIG. 8 is a conceptual block diagram of a group of vehicles including two vehicles that are receiving false positioning signals, in accordance with some examples of this disclosure.

FIG. 8 is a conceptual block diagram of a group of vehicles 80A-80D including two vehicles 80A and 80C that are receiving false positioning signals 84A and 84C, in accordance with some examples of this disclosure. Each of vehicles 80A and 80C may determine an incorrect location for itself and transmit surveillance signals to vehicles 80A-80D that include incorrect location data.

The errors in the determined locations of vehicles 80A and 80C may be similar, causing vehicles 80A and 80C to determine that the surveillance signals received from vehicles 80A and 80C do not include a discrepancy. Vehicles 80A and 80C to determine that the surveillance signals received from vehicles 80B and 80D include discrepancy. Likewise, vehicles 80B and 80D may determine that the surveillance signals received from vehicles 80B and 80D do not include a discrepancy and that the surveillance signals received from vehicles 80A and 80C include discrepancy.

Each of vehicles 80A-80D may transmit alert signals to the other vehicles indicating the surveillance signals that include a discrepancy. Vehicles 80A-80D may base a determination on which vehicles are being spoofed on additional data, such as alert signals from other vehicles, and the relative locations of vehicles 80A-80D.

Figure 9:
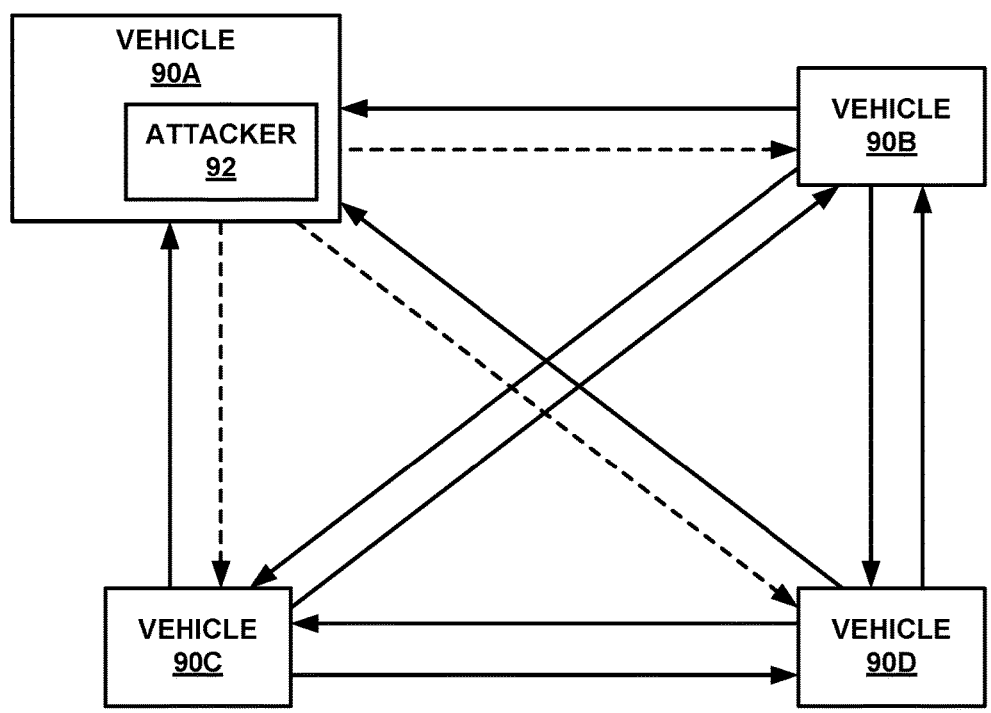
FIG. 9 is a conceptual block diagram of a group of vehicles including a vehicle that is transmitting false surveillance signals, in accordance with some examples of this disclosure.

FIG. 9 is a conceptual block diagram of a group of vehicles 90A-90D including vehicle 90A that is transmitting false surveillance signals, in accordance with some examples of this disclosure. Vehicles 90B-90D may determine that each of the surveillance signals transmitted by vehicle 90A includes a discrepancy. Vehicles 90B-90D may transmit alert signals to each other indicating that vehicle 90A is transmitting false surveillance signals or that vehicle 90A received false positioning signals.

Figure 10A:
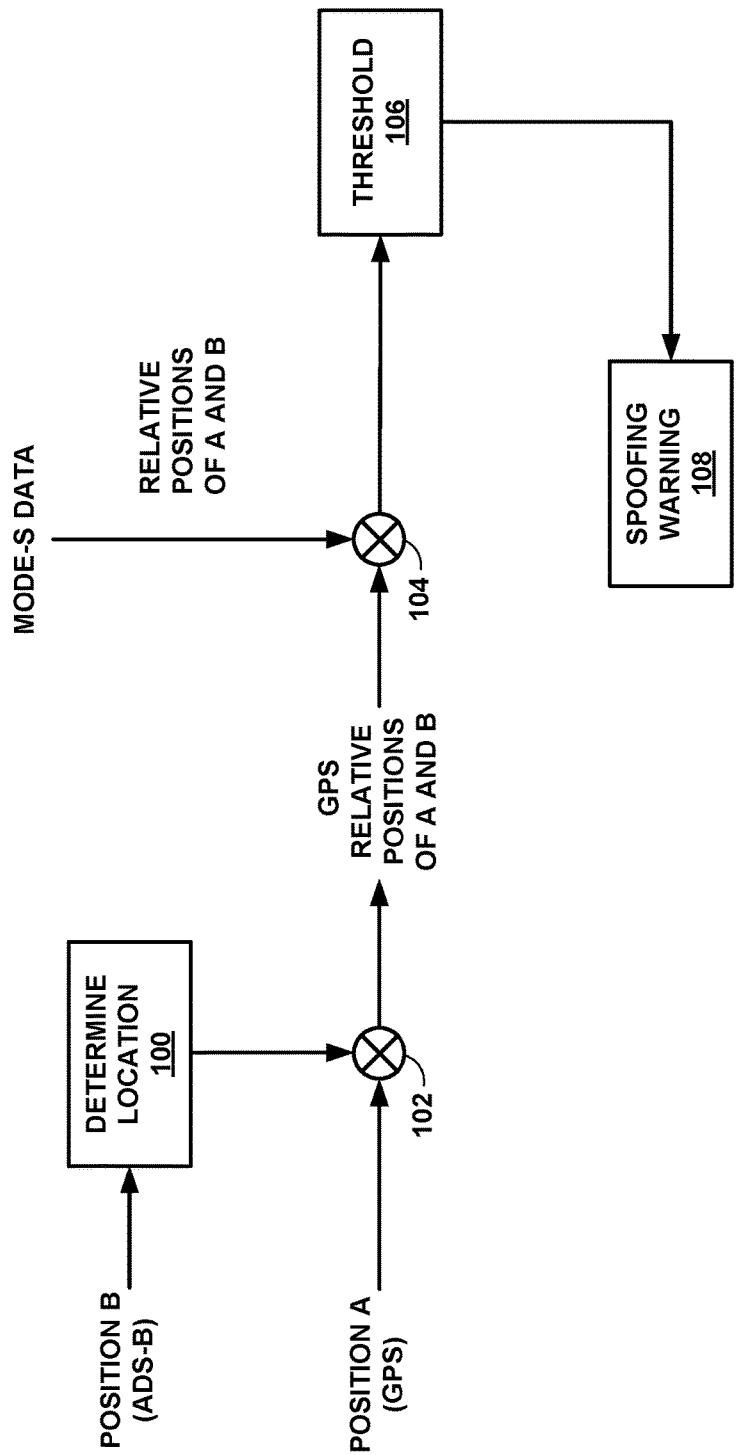
FIGS. 10A and 10B are flow diagrams for determining that surveillance signals include a discrepancy, in accordance with some examples of this disclosure.
Figure 10B:
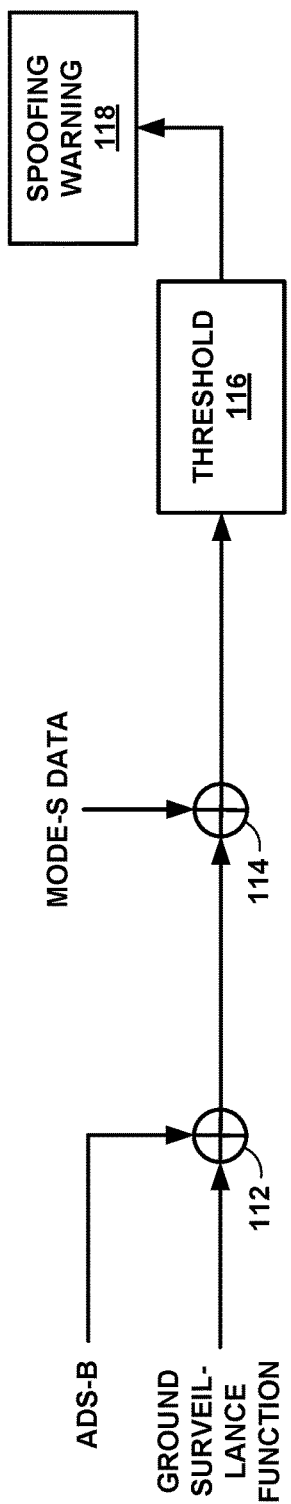

FIGS. 10A and 10B are flow diagrams for determining that surveillance signals include a discrepancy, in accordance with some examples of this disclosure. FIGS. 10A and 10B may illustrate the operation of processing circuitry 8. At module 100, processing circuitry 8 may be configured to analyze the surveillance data in a surveillance signal to determine the absolute location of vehicle B. The surveillance signal may include ADS-B data that indicates the location coordinates of vehicle B, such as latitude, longitude, and altitude. At module 102, processing circuitry 8 may be configured to determine the location of vehicle B relative to vehicle A, which may be ownship vehicle 2. In some examples, processing circuitry 8 may be configured to perform a subtraction operation on the latitudes of vehicles A and B, the longitudes of vehicles A and B, and altitude of vehicles A and B.

At module 104, processing circuitry 8 may be configured to compare the relative location of vehicle B based on the surveillance data and positioning signals to the relative location of vehicle B based on the actual characteristics of the surveillance signals. The actual characteristics may be detected by transceiver 6, which may be a Mode-S transponder. The difference between the expected characteristics and the actual characteristics may be compared to a threshold level at module 106. Processing circuitry 8 may be configured to discard or ignore differences that are less than the threshold level to reduce the likelihood of false alarms.

If the difference between the expected characteristics and the actual characteristics exceeds the threshold level, processing circuitry 8 may be configured to output a spoofing warning at module 108. The spoofing warning may be an alert signal that is displayed to crewmembers of ownship vehicle 2 and/or transmitted to other vehicles.

FIG. 10B illustrates an operation that replaces positioning signals with ground surveillance data at module 112. Processing circuitry 8 may be configured to determine the relative location of vehicle B at module 112 based on surveillance data from vehicle B and ground surveillance data indicating the location of ownship vehicle 2. At module 114, processing circuitry 8 may be configured to compare the expected characteristics and the actual characteristics of surveillance signals received from vehicle B. At module 116, processing circuitry 8 may be configured to apply a threshold to reduce false alarms. At module 118, processing circuitry 8 may be configured to output a spoofing warning.

Figure 11:
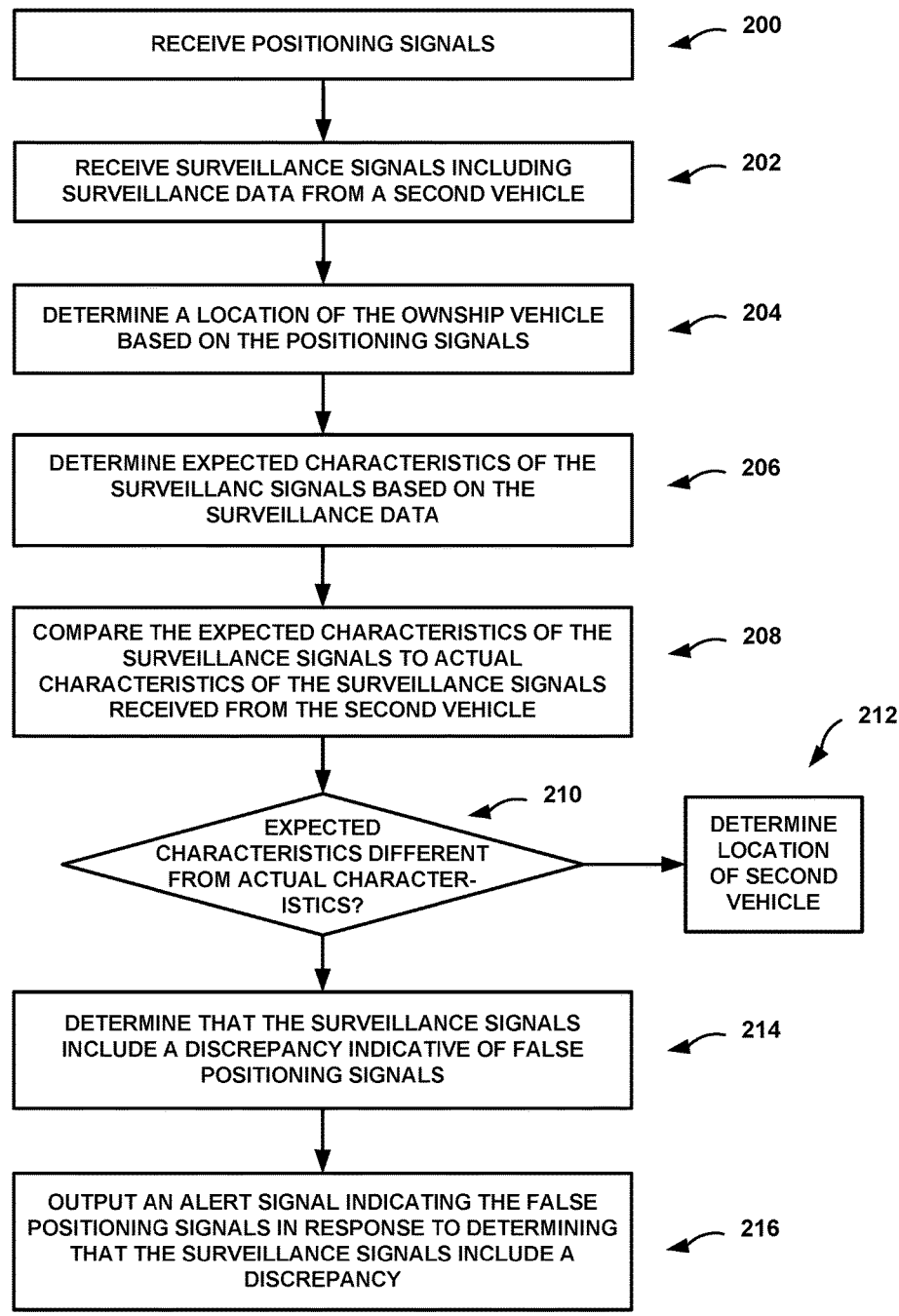
FIG. 11 shows a flowchart for an example technique for determining that surveillance signals include a discrepancy indicative of false positioning signals, in accordance with some examples of this disclosure.

FIG. 11 shows a flowchart for example techniques for determining that surveillance signals include a discrepancy indicative of false positioning signals, in accordance with some examples of this disclosure. The techniques of FIG. 11 are described with reference to the system of FIG. 2, including transceiver 6 and processing circuitry 8, although other components may perform similar techniques.

The techniques of FIG. 11 include receiving positioning signals 24A-24D (200). Transceiver 6 may receive positioning signals 24A-24D from GNSS transmitters 22A-22D. The techniques of FIG. 11 further include receiving surveillance signals 26A including surveillance data from vehicle 20A (202). The surveillance data may include location data indicating the location of vehicle 20A.

The techniques of FIG. 11 further include determining a location of ownship vehicle 2 based on positioning signals 24A-24D (204). Processing circuitry 8 may apply algorithms to the data in positioning signals 24A-24D to determine the location of ownship vehicle 2. The techniques of FIG. 11 further include determining expected characteristics of surveillance signals 26A based on the surveillance data (206). The expected characteristics may indicate the relative location of vehicle 20A as well as the expected angle of reception of surveillance signals 26A by transceiver 6.

The techniques of FIG. 11 further include comparing the expected characteristics and actual characteristics of the surveillance signals 26A received from vehicle 20A (208). Processing circuitry 8 may apply a threshold filter to determine if the differences between the expected characteristics and the actual characteristics exceed the threshold level. If the expected characteristics are not different from the actual characteristics, the techniques of FIG. 11 include determining a location of the second vehicle (212). If the expected characteristics are different from the actual characteristics, the techniques of FIG. 11 further include determining that the surveillance signals 26A include a discrepancy indicative of false positioning signals in response to comparing the expected characteristics and the actual characteristics (214). If the differences between the expected characteristics and the actual characteristics exceed the threshold level, processing circuitry may be configured to determine that the surveillance signals 26A include a discrepancy.

The techniques of FIG. 11 further include outputting an alert signal indicating the false positioning signals in response to determining that the surveillance signals 26A include a discrepancy (216). Processing circuitry 8 may be configured to output the alert signal to a display device in ownship vehicle 2. Processing circuitry 8 may also be configured to cause transceiver 6 to transmit the alert signal to vehicle 20B to communicate that vehicle 20A is transmitting surveillance signals 26A including a discrepancy.

The following examples may illustrate one or more of the techniques of this disclosure.

Example 1

A system, configured to mount on an ownship vehicle, includes a transceiver configured to receive positioning signals and receive surveillance signals including surveillance data from a second vehicle. The system also includes processing circuitry configured to determine a location of the ownship vehicle based on the positioning signals received by the transceiver and determine expected characteristics of the surveillance signals based on the surveillance data. The processing circuitry is further configured to compare the expected characteristics and actual characteristics of the surveillance signals received from the second vehicle.

The processing circuitry is also configured to determine that the surveillance signals include a discrepancy indicative of false positioning signals in response to comparing the expected characteristics and the actual characteristics. The processing circuitry is configured to output an alert signal indicating the false positioning signals in response to determining that the surveillance signals include a discrepancy.

Example 2

The system of example 1, wherein the processing circuitry is further configured to determine that all surveillance signals received from other vehicles include a discrepancy. The processing circuitry is also configured to determine that the transceiver received false positioning signals from an attacker in response to determining that all surveillance signals received from other vehicles include a discrepancy. The processing circuitry is configured to output the alert signal indicating that the transceiver received false positioning signals.

Example 3

The system of examples 1-2 or any combination thereof, wherein the processing circuitry is further configured to determine that no surveillance signals received from vehicles other than the second vehicle include a discrepancy. The processing circuitry is also configured to determine that the second vehicle received false positioning signals from an attacker in response to determining that no surveillance signals received from vehicles other than the second vehicle include a discrepancy. The processing circuitry is configured to output the alert signal indicating that the second vehicle received false positioning signals.

Example 4

The system of examples 1-3 or any combination thereof, wherein the alert signal is a first alert signal, and wherein the processing circuitry is further configured to determine that surveillance signals received from a third vehicle do not include a discrepancy and determine that the transceiver received a second alert signal from the third vehicle, wherein the second alert signal indicates that the third vehicle determined that surveillance signals received by the third vehicle from the second vehicle included a discrepancy. The processing circuitry is also configured to determine that the second vehicle received false positioning signals, in response to determining that surveillance signals received from the third vehicle do not include a discrepancy and determining that the transceiver received the second alert signal from the third vehicle. The processing circuitry is configured to output the first alert signal indicating that the second vehicle received false positioning signals.

Example 5

The system of examples 1-4 or any combination thereof, wherein the processing circuitry is configured to determine that a difference between the expected characteristics and the actual characteristics exceeds a threshold level and determine that the surveillance signals from the second vehicle include the discrepancy, in response to determining that the difference between the expected characteristics and the actual characteristics exceeds the threshold level.

Example 6

The system of examples 1-5 or any combination thereof, wherein the processing circuitry is configured to output the alert signal by at least generating a warning based on the determined discrepancy, in response to determining that the surveillance signals include a discrepancy and outputting the warning to a crewmember of the ownship vehicle.

Example 7

The system of examples 1-6 or any combination thereof, wherein the processing circuitry is configured to output the alert signal by at least causing the transceiver to transmit the alert signal to the second vehicle.

Example 8

The system of examples 1-7 or any combination thereof, wherein the processing circuitry is further configured to, in response to determining that the surveillance signals do not include a discrepancy, determine a location of the second vehicle based on the surveillance data and generate a graphical representation of the location of the ownship vehicle and the location of the second vehicle.

Example 9

The system of examples 1-8 or any combination thereof, wherein the processing circuitry is configured to determine that surveillance signals received from a third vehicle do not include a discrepancy, determine that the second vehicle is closer than the third vehicle to the ownship vehicle. The processing circuitry is also configured to determine that the second vehicle received false positioning signals from an attacker, in response to, determining that surveillance signals received from the third vehicle do not include a discrepancy and determining that the second vehicle is closer than the third vehicle to the ownship vehicle. The processing circuitry is configured to output the alert signal indicating that the transceiver and the second vehicle received false positioning signals.

Example 10

The system of examples 1-9 or any combination thereof, wherein the processing circuitry is further configured to determine that surveillance signals received from a third vehicle include a discrepancy, determine that the second vehicle is closer than the ownship vehicle to the third vehicle, determine that the third vehicle is closer than the ownship vehicle to the second vehicle, and determine that the second vehicle did not indicate any discrepancy in the surveillance signals received from the third vehicle. The processing circuitry is also configured to determine that the second vehicle and the third vehicle received false positioning signals from an attacker, in response to determining that surveillance signals received from a third vehicle include a discrepancy, determining that the second vehicle is closer than the ownship vehicle to the third vehicle, and determining that the third vehicle is closer than the ownship vehicle to the second vehicle. The processing circuitry is configured to output the alert signal indicating that the second vehicle and the third vehicle received false positioning signals.

Example 11

The system of examples 1-10 or any combination thereof, wherein the processing circuitry is further configured to determine that surveillance signals received from a third vehicle do not include a discrepancy, and determine that the ownship vehicle is closer than the second vehicle to the third vehicle. The processing circuitry is further configured to determine that the second vehicle received false positioning signals from an attacker, in response to determining that surveillance signals received from a third vehicle do not include a discrepancy, determining that the ownship vehicle is closer than the third vehicle to the second vehicle, and determining that the ownship vehicle is closer than the second vehicle to the third vehicle.

Example 12

The system of examples 1-11 or any combination thereof, wherein the positioning signals include Global Navigation Satellite System (GNSS) signals, and wherein the positioning signals include automatic dependent surveillance-broadcast (ADS-B) signals.

Example 13

A method including receiving positioning signals, receiving surveillance signals including surveillance data from a second vehicle, and determining a location of an ownship vehicle based on the positioning signals. The method further includes determining expected characteristics of the surveillance signals based on the surveillance data and comparing the expected characteristics and actual characteristics of the surveillance signals received from the second vehicle. The method also includes determining that the surveillance signals include a discrepancy indicative of false positioning signals in response to comparing the expected characteristics and the actual characteristics and outputting an alert signal indicating the false positioning signals in response to determining that the surveillance signals include a discrepancy.

Example 14

The method of example 13, further including receiving surveillance signals from other vehicles and determining that all of the surveillance signals received from other vehicles include a discrepancy. The method also includes determining that the transceiver received false positioning signals from an attacker in response to determining that all of the surveillance signals from other vehicles include a discrepancy. Outputting the alert signal includes outputting the alert signal indicating that the transceiver received false positioning signals.

Example 15

The method of examples 13-14 or any combination thereof, further including receiving surveillance signals from vehicles other than the second vehicle and determining that none of the surveillance signals received from the vehicles other than the second vehicle include a discrepancy. The method also includes determining that the second vehicle received false positioning signals from the attacker in response to determining that none of the surveillance signals received from the vehicles other than the second vehicle include a discrepancy. Outputting the alert signal includes outputting the alert signal indicating that the second vehicle received false positioning signals.

Example 16

The method of examples 13-15 or any combination thereof, wherein the alert signal is a first alert signal, the method further including receiving surveillance signals from a third vehicle, determining that the surveillance signals received from the third vehicle do not include a discrepancy, receiving a second alert signal from the third vehicle, wherein the second alert signal indicates that the third vehicle determined that surveillance signals received by the third vehicle from the second vehicle included a discrepancy. The method also includes determining that the second vehicle received false positioning signals, in response to determining that surveillance signals received from the third vehicle do not include a discrepancy, and receiving the second alert signal from the third vehicle. Outputting the first alert signal includes outputting the first alert signal indicating that the second vehicle received false positioning signals.

Example 17

The method of examples 13-16 or any combination thereof, further including determining that a difference between the expected characteristics and the actual characteristics exceeds a threshold level, wherein determining that the surveillance signals from the second vehicle include the discrepancy is in response to determining that a difference between the expected characteristics and the actual characteristics exceeds a threshold level.

Example 18

The method of examples 13-17 or any combination thereof, wherein outputting the alert signals includes transmitting the alert signal to the second vehicle.

Example 19

The method of examples 13-18 or any combination thereof, further including determining a location of the second vehicle based on the surveillance data and generating a graphical representation of the location of the ownship vehicle and the location of the second vehicle, in response to determining that the surveillance signals do not include a discrepancy.

Example 20

A computer-readable medium having executable instructions stored thereon, configured to be executable by one or more processors for causing the one or more processors to determine a location of an ownship vehicle based on positioning signals received by a transceiver mounted on the ownship vehicle, and determine expected characteristics of surveillance signals received by the transceiver from a second vehicle based on surveillance data of the surveillance signals. The instructions are further executable for causing the one or more processors to compare the expected characteristics and actual characteristics of the surveillance signals received from the second vehicle, determine that the surveillance signals include a discrepancy indicative of false positioning signals in response to comparing the expected characteristics and the actual characteristics. The instructions are executable for causing the one or more processors to output an alert signal indicating the false positioning signals from an attacker in response to determining that the surveillance signals include a discrepancy.

Example 21

The system of examples 1-12 or any combination thereof, wherein the processing circuitry is configured to determine the expected characteristics of the surveillance signals by at least determining an expected angle of arrival of the surveillance signals or an expected phase shift across antenna elements of the transceiver caused by receiving the surveillance signals.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 4 may include one or more memory devices, such as memory device 18, that include any volatile or non-volatile media, such as a RAM, ROM, non-volatile RAM (NVRAM), electrically erasable programmable ROM (EEPROM), flash memory, and the like. The one or more memory devices may store computer readable instructions that, when executed by processing circuitry, cause the processing circuitry to implement the techniques attributed herein to processing circuitry.

Elements of the processing circuitry and/or the transceiver may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of the processing circuitry and/or the transceiver as in any of the examples herein may be implemented as a device, a system, an apparatus, and may embody or implement a method of interleaving a weather detection mode and object detection mode.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. The techniques of this disclosure may be implemented in a system that is integrated into a vehicle or a handheld device. The handheld device may be mobile, such as a smartphone, tablet, laptop computer, and/or any other suitable device. In some examples, the techniques of this disclosure may be implemented in any GPS device, including navigation devices, phones, watches, tablets, regardless of whether the device is in a vehicle.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A system, configured to mount on an ownship vehicle, the system comprising:
    a transceiver configured to:
        receive positioning signals; and
        receive surveillance signals including surveillance data from a second vehicle;
        receive a first alert signal indicating that surveillance signals received by the third vehicle from the second vehicle included a discrepancy; and
    processing circuitry configured to:
        determine a location of the ownship vehicle based on the positioning signals received by the transceiver;
        determine expected characteristics of the surveillance signals received by the transceiver from the second vehicle based on the surveillance data;
        compare the expected characteristics and actual characteristics of the surveillance signals received from the second vehicle;
        determine that the surveillance signals received by the transceiver from the second vehicle include a discrepancy indicative of false positioning signals in response to comparing the expected characteristics and the actual characteristics;
        determine that the transceiver received the first alert signal;
        determine the second vehicle received the false positioning signals in response to:
            determining that the surveillance signals received by the transceiver from the second vehicle include the discrepancy; and
            determining that the transceiver received the first alert signal; and
        output a second alert signal indicating that the second vehicle received the false positioning signals in response to determining that the second vehicle received the false positioning signals.

2. The system of claim 1, wherein the processing circuitry is further configured to:
    determine that all surveillance signals received from other vehicles include a discrepancy;
    determine that the transceiver received false positioning signals from an attacker in response to determining that all surveillance signals received from other vehicles include the discrepancy; and
    output a third alert signal indicating that the transceiver received false positioning signals.

3. The system of claim 1, wherein the processing circuitry is further configured to:
    determine that no surveillance signals received from vehicles other than the second vehicle include a discrepancy; and
    determine that the second vehicle received the false positioning signals from an attacker in response to determining that no surveillance signals received from vehicles other than the second vehicle include the discrepancy, wherein the processing circuitry is configured to output the second alert signal indicating that the second vehicle received the false positioning signals.

4. The system of claim 1, wherein the processing circuitry is further configured to determine that surveillance signals received by the transceiver from the third vehicle do not include a discrepancy, wherein the processing circuitry is configured to determine that the second vehicle received the false positioning signals, in response to determining that the surveillance signals received from the third vehicle do not include the discrepancy.

5. The system of claim 1, wherein the processing circuitry is configured to:

determine that a difference between the expected characteristics and the actual characteristics exceeds a threshold level; and determine that the surveillance signals from the second vehicle include the discrepancy, in response to determining that the difference between the expected characteristics and the actual characteristics exceeds the threshold level.

6. The system of claim 1, wherein the processing circuitry is configured to output the alert signal by at least:

generating a warning based on the determined discrepancy, in response to determining that the surveillance signals received from the second vehicle include the determined discrepancy; and outputting the warning to a crewmember of the ownship vehicle.

7. The system of claim 1, wherein the processing circuitry is configured to output the second alert signal by at least causing the transceiver to transmit the second alert signal to the second vehicle.

8. The system of claim 1, wherein the processing circuitry is further configured to:

determine that the surveillance signals received by the transceiver from the second vehicle do not include the discrepancy;

in response to determining that the surveillance signals received by the transceiver from the second vehicle do not include the discrepancy:

determine a location of the second vehicle based on the surveillance data; and generate a graphical representation of the location of the ownship vehicle and the location of the second vehicle.

9. The system of claim 1, wherein the processing circuitry is configured to:

determine that surveillance signals received from the third vehicle do not include a discrepancy;

determine that the second vehicle is closer than the third vehicle to the ownship vehicle; and determine that the transceiver and the second vehicle received false positioning signals from an attacker, in response to:

determining that surveillance signals received from the third vehicle do not include a discrepancy, and determining that the second vehicle is closer than the third vehicle to the ownship vehicle, wherein the processing circuitry is configured to output a third alert signal indicating that the transceiver and the second vehicle received the false positioning signals.

10. The system of claim 1, wherein the processing circuitry is further configured to:

determine that surveillance signals received from the third vehicle include a discrepancy;

determine that the second vehicle is closer than the ownship vehicle to the third vehicle;

determine that the third vehicle is closer than the ownship vehicle to the second vehicle;

determine that the second vehicle did not indicate any discrepancy in the surveillance signals received from the third vehicle;

determine that the second vehicle and the third vehicle received false positioning signals from an attacker, in response to:

determining that surveillance signals received from a third vehicle include a discrepancy, determining that the second vehicle is closer than the ownship vehicle to the third vehicle, and determining that the third vehicle is closer than the ownship vehicle to the second vehicle, wherein the processing circuitry is configured to output a third alert signal indicating that the second vehicle and the third vehicle received false positioning signals.

11. The system of claim 1, wherein the processing circuitry is further configured to:

determine that surveillance signals received from the third vehicle do not include a discrepancy;

determine that the ownship vehicle is closer than the second vehicle to the third vehicle; and determine that the second vehicle received the false positioning signals from an attacker, in response to:

determining that surveillance signals received from the third vehicle do not include the discrepancy;

determining that the ownship vehicle is closer than the third vehicle to the second vehicle; and determining that the ownship vehicle is closer than the second vehicle to the third vehicle.

12. The system of claim 1, wherein the positioning signals comprise Global Navigation Satellite System (GNSS) signals, and wherein the surveillance signals comprise automatic dependent surveillance-broadcast (ADS-B) signals.

13. The system of claim 1, wherein the processing circuitry is configured to determine the expected characteristics of the surveillance signals received by the transceiver from the second vehicle by at least determining an expected angle of arrival of the surveillance signals or an expected phase shift across antenna elements of the transceiver caused by receiving the surveillance signals.

14. A method comprising:

receiving positioning signals;

receiving surveillance signals including surveillance data from a second vehicle;

receiving a first alert signal indicating that surveillance signals received by the third vehicle from the second vehicle included a discrepancy;

determining a location of an ownship vehicle based on the positioning signals;

determining expected characteristics of the surveillance signals received by the transceiver from the second vehicle based on the surveillance data;

comparing the expected characteristics and actual characteristics of the surveillance signals received from the second vehicle;

determining that the surveillance signals received by the transceiver from the second vehicle include a discrepancy indicative of false positioning signals in response to comparing the expected characteristics and the actual characteristics;

determining that the transceiver received the first alert signal;

determining the second vehicle received the false positioning signals in response to:

determining that the surveillance signals received by the transceiver from the second vehicle include the discrepancy; and determining that the transceiver received the first alert signal; and outputting a second alert signal indicating that the second vehicle received the false positioning signals in response to determining that the second vehicle received the false positioning signals.

15. The method of claim 14, further comprising:

receiving surveillance signals from other vehicles;

determining that all of the surveillance signals received from other vehicles include a discrepancy;

determining that the transceiver received false positioning signals from an attacker in response to determining that all of the surveillance signals from other vehicles include the discrepancy; and outputting a third alert signal indicating that the transceiver received false positioning signals.

16. The method of claim 14, further comprising:

receiving surveillance signals from vehicles other than the second vehicle;

determining that none of the surveillance signals received from the vehicles other than the second vehicle include a discrepancy; and determining that the second vehicle received false positioning signals from the attacker in response to determining that none of the surveillance signals received from the vehicles other than the second vehicle include the discrepancy, wherein outputting the alert signal comprises outputting the second alert signal indicating that the second vehicle received the false positioning signals.

17. The method of claim 14, further comprising:

receiving surveillance signals from a third vehicle; and determining that the surveillance signals received from the third vehicle do not include a discrepancy, wherein determining that the second vehicle received the false positioning signals comprises determining that the second vehicle received the false positioning signals in response to determining that the surveillance signals received from the third vehicle do not include the discrepancy.

18. The method of claim 14, further comprising determining that a difference between the expected characteristics and the actual characteristics exceeds a threshold level, wherein determining that the surveillance signals from the second vehicle include the discrepancy is in response to determining that the difference between the expected characteristics and the actual characteristics exceeds the threshold level.

19. The method of claim 14, further comprising:

determine that, in a second instance, the surveillance signals received by the transceiver from the second vehicle do not include the discrepancy;

determining, in the second instance, a location of the second vehicle based on the surveillance data; and generating, in the second instance, a graphical representation of the location of the ownship vehicle and the location of the second vehicle, in response to determining that the surveillance signals do not include the discrepancy.

20. A non-transitory computer-readable medium having executable instructions stored thereon, configured to be executable by one or more processors for causing the one or more processors to:

determine a location of an ownship vehicle based on positioning signals received by a transceiver mounted on the ownship vehicle;

determine expected characteristics of surveillance signals received by the transceiver from a second vehicle based on surveillance data of the surveillance signals;

compare the expected characteristics and actual characteristics of the surveillance signals received from the second vehicle;

determine that the surveillance signals received by the transceiver from the second vehicle include a discrepancy indicative of false positioning signals in response to comparing the expected characteristics and the actual characteristics;

determining that the transceiver received a first alert signal indicating that surveillance signals received by the third vehicle from the second vehicle included a discrepancy;

determining the second vehicle received the false positioning signals in response to:

determining that the surveillance signals received by the transceiver from the second vehicle include the discrepancy; and determining that the transceiver received the first alert signal; and output a second alert signal indicating that the second vehicle received the false positioning signals from an attacker in response to determining that the second vehicle received the false positioning signals.

* * * * *

UNITED STATES PATENT AND TRADEMARK OFFICE
CERTIFICATE OF CORRECTION

PATENT NO. : 10,137,863 B2
APPLICATION NO. : 15/467604
DATED : November 27, 2018
INVENTOR(S) : Daniel P. Johnson It is certified that error appears in the above-identified patent and that said Letters Patent is hereby corrected as shown below:

In the Claims

Column 26, Claim 19, Line 7: "determine" should read --determining--
Column 26, Claim 20, Line 37: "determining" should read --determine--
Column 26, Claim 20, Line 41: "determining" should read --determine--

Signed and Sealed this
Seventeenth Day of March, 2020

Andrei Iancu
*Director of the United States Patent and Trademark Office*